United States Patent
Kadono

(10) Patent No.: US 6,836,273 B1
(45) Date of Patent: Dec. 28, 2004

(54) MEMORY MANAGEMENT METHOD, IMAGE CODING METHOD, IMAGE DECODING METHOD, IMAGE DISPLAY METHOD, MEMORY MANAGEMENT APPARATUS, AND MEMORY MANAGEMENT PROGRAM STORAGE MEDIUM

(75) Inventor: Shinya Kadono, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 344 days.

(21) Appl. No.: 09/709,422

(22) Filed: Nov. 13, 2000

(30) Foreign Application Priority Data

Nov. 11, 1999 (JP) ............................................. 11-321659

(51) Int. Cl.$^7$ ............................................... G06F 12/02
(52) U.S. Cl. ...................... 345/543; 345/544; 345/572; 345/531
(58) Field of Search ................................ 345/501–506, 345/519–520, 522, 530–574; 711/100, 170–173, 202, 214

(56) References Cited

U.S. PATENT DOCUMENTS 6,067,098 A * 5/2000 Dye ............................ 345/521

6,301,299 B1 * 10/2001 Sita et al. ............... 375/240.01

OTHER PUBLICATIONS

"Overview of the MPEG–4 standard", ISO/IECJTC1/SC29/WG11 N1730, Jul. 1997.

* cited by examiner

Primary Examiner—Kee M. Tung
(74) Attorney, Agent, or Firm—Wenderoth, Lind & Ponack, L.L.P.

(57) ABSTRACT

A method increases the efficiency of a memory bank and greatly reduces the risk of erasure of frame data which are required for coding, decoding or display. FM1a, FM1b, FM2a and FM2b are the first frame area of the first image sequence, the second frame area of the first image sequence, the first frame area of the second image sequence and the second frame area of the second image sequence, respectively. AD12a and AD12b are the first address start location of the first image sequence and the second address start location of the first image sequence, respectively. The frame sizes SZ1a and SZ1b are reserved from the respective start locations toward higher addresses in the first image sequence, respectively. The frame sizes SZ2a and SZ2b are reserved from AD12b–SZ2a and AD34a–SZ2b toward higher addresses in the second image sequence, respectively.

18 Claims, 31 Drawing Sheets

MEMORY MANAGEMENT METHOD, IMAGE CODING METHOD, IMAGE DECODING METHOD, IMAGE DISPLAY METHOD, MEMORY MANAGEMENT APPARATUS, AND MEMORY MANAGEMENT PROGRAM STORAGE MEDIUM

FIELD OF THE INVENTION

The present invention relates to a memory management method, an image coding method, an image decoding method, image display method, a memory management apparatus, an image coding apparatus, an image decoding apparatus, an image display apparatus, a memory management program storage medium, an image coding program storage medium, an image decoding program storage medium and an image display program storage medium.

More particularly, the present invention relates to a memory management method which can reduce a memory capacity required for coding, decoding or displaying plural image sequences simultaneously, a method for coding images, decoding images and displaying images utilizing this memory, an apparatus corresponding to these memory management methods and method for coding images, decoding images and displaying images, and a storage medium which contains a program for implementing the respective methods by software.

BACKGROUND OF THE INVENTION

In recent years, we have greeted the age of multimedia in which audio, video and other pixel values are integrally handled, and the conventional information media (i.e., means for transmitting information to people), such as newspapers, magazines, televisions, radios, and telephones, have been adopted as the subjects of multimedia.

Generally, "multimedia" means to represent, not only characters, but also diagrams, speech, and especially images simultaneously in relation with each other. In order to handle the conventional information media as the subjects of multimedia, it is necessary to transform the information into a digital format.

When the quantity of data possessed by each information medium described above is estimated as the quantity of digital data, in cases of characters, the data quantity for each character is 12 byte. However, in cases of speech, the data quantity is 64 kbits per second (quality for telecommunication) and, in cases of moving pictures, it is more than 100 Mbits per second (quality for current television broadcasting). So, as for the information media described above, it is not practical to handle such massive data as it is in the digital format. For example, although visual telephones have already been put to practical use by ISDN (Integrated Services Digital Network) having a transmission rate of 64 kbps–1.5 Mbps, it is impossible to transmit an image of a television camera as it is by the ISDN.

So, data compression technologies are demanded. In cases of visual telephones, the moving picture compression technologies standardized as H.261 and H.263 by ITU-T (International Telecommunication Union-Telecommunication Sector) are employed. Further, according to the data compression technology based on MPEG1, it is possible to record image data, together with audio data, in an ordinary music CD (compact disk).

MPEG (Moving Picture Experts Group) is an international standard of data compression for a pixel value of a moving picture. In MPEG1, a pixel value of a moving picture is compressed to 1.5 Mbps, i.e., data of a television signal is compressed to about 1/100. Since the transmission rate to which MPEG1 is directed is limited to about 1.5 Mbps, MPEG2 is standardized to meet the demand for higher image quality. In MPEG2, a pixel value of a moving picture is compressed to 2~15 Mbps.

Under the existing circumstances, standardization of MPEG4 is now proceeded by the working group for standardization of MPEG1 and MPEG2 (ISO/IEC JTC1/SC29/WG11). MPEG4 enables coding and processing in units of objects included in an image, and thereby realizes new functions required in the age of multimedia. MPEG4 had originally aimed at standardization of a coding method at a low bit rate, but the aim of standardization has now extended to a more versatile coding process including coding of an interlace image and coding at a high bit rate.

One of the characteristics of MPEG4 is a mechanism for coding and transmitting plural image sequences simultaneously. According to this mechanism, one image scene can be composed of plural images. For example, different image sequences can be used as foreground and background, whereby their frame frequencies, image qualities or bit rates are changed individually. Accordingly, plural image sequences are arranged in the horizontal or vertical direction like a multi-screen on a television receiver or the like, whereby the user can extract or zoom only desired image sequences.

FIG. 15 is a diagram showing a typical example where MPEG coding is performed to an image sequence. This figure shows an example of a frame structure according to MPEG1 or MPEG2. In MPEG4, this corresponds to a reference structure of a VOP of a certain object.

In MPEG coding, there are a frame (I frame) which is coded only by intra-frame operation, a frame (P frame) which is subjected to inter-frame prediction coding performed utilizing the correlation between frames, and a frame (B frame) which is subjected to bidirectional prediction coding performed on the basis of the past frame and the future frame.

FIG. 15 shows the case where MPEG coding is performed to contiguous eight frames FR1, FR2, ..., FR8. The frames FR1 and FR5 are I frames. Other frames, i.e., FR2, FR3, FR4, FR6, FR7 and FR8, are P frames.

The I frame can be decoded by itself. However, the P frame cannot be coded or decoded when a frame at the previous time, which is to be referred to, has not been coded or decoded correctly. Therefore, when a transmission error of a bit stream or failure at decoding time occurs, correct image data cannot be obtained until the next I frame is input.

In coding or decoding the P frame, a reference frame is required. Accordingly, the reference frame and one frame for recording data in the process of coding or decoding the present frame, i.e., two frames of the memory, are required for encoding or decoding of one image sequence (object). Similarly, 2n frames of memory area are required for encoding or decoding of n image sequences. Accordingly, in the prior art, the memory address space is divided into 2n pieces, each of the divided areas (banks) is used as one frame of the memory, and the image data is stored therein.

FIG. 16 shows a conventional way of dividing the memory address. In this figure, FM1$a$, FM1$b$, FM2$a$, FM2$b$, FM3$a$ and FM3$b$ denote a first frame area of a first image sequence, a second frame area of the first image sequence, a first frame area of a second image sequence, a second frame area of the second image sequence, a first frame area of a third image sequence and a second frame sequence of the third image sequence, respectively.

In addition, AD1a, AD1b, AD2a, AD2b, AD3a and AD3b denote a first address start location of the first image sequence, a second address start location of the first image sequence, a first address start location of the second image sequence, a second address start location of the second image sequence, a first address start location of the third image sequence and a second address start location of the third image sequence, respectively. AD1a to AD1b-1 corresponds to a 1a-th memory bank. AD1b to AD2a-1 corresponds to a 1b-th memory bank. AD2a to AD2b-1 corresponds to a 2a-th memory bank. AD2b to AD3a-1 corresponds to a 2b-th memory bank. AS3a to AD3b-1 corresponds to a 3a-th memory bank.

SZ1a, SZ1b, SZ2a, SZ2b, SZ3a and SZ3b denote a first frame size of the first image sequence, a second frame size of the first image sequence, a first frame size of the second image sequence, a second frame size of the second image sequence, a first frame size of the third image sequence, and a second frame size of the third image sequence, respectively.

Here, the way of storing image data of each image sequence is described taking the case of decoding the frames FR1, FR2, . . . , FR8 in FIG. 15 as an example.

Assume that these frames FR1, FR2, . . . , FR8 constitute one image sequence (assuming the first image sequence). This image sequence corresponds to one object in MPEG4 and one GOP in MPEG2.

Initially, the frame FR1 as the first I frame in the first image sequence is decoded and a decoded image data is stored in the frame area FM1a.

Next, the frame FR2 is decoded with reference to the decoded image data of the frame FR1 which has been stored in the frame area FM1a, and the result of the decoding is stored in the frame area FM1b.

Then, the frame FR3 is decoded with reference to the decoded image data of the frame FR2 which has been stored in the frame area FM1b, and the result of the decoding is stored in the frame area FM1a. That is because the image data of the frame FR1 is no longer required for decoding the frame FR3 and therefore the data in the frame area FM1a can be overwritten by the decoded image data of the frame FR3.

Further, the frame FR4 is decoded with reference to the decoded image data of the frame FR3 which has been stored in the frame area FM1a and the result of the decoding is stored in the frame area FM1b.

Hereinafter, the frames FR5 to FR8 of the first image sequence are similarly decoded with the use of the two frame areas FM1a and FM1b alternately.

The frames of the second and third image sequence are decoded similarly. To be specific, the frames of the second image sequence are decoded with the use of the two frame areas FM2a and FM2b alternately and the frames of the third image sequence are decoded with the use of the two frame areas FM3a and FM3b alternately, respectively.

Also, when the coding such as inter-frame prediction coding or the display of images is performed, the coding or image display is performed similarly by alternately using two frame areas which are adjacent to each other in the memory.

While I frame or P frame is referenced to decode P frame or B frame, B frame is not referenced to decode another B frames or P frame. Therefore, B frame is not stored in the memory.

If B frame exists between the frames FR2 and FR3, this B frame is decoded with referring to the frame FR2 which has been stored in the frame area FM1b and the frame FR3 which has been stored in the frame area FM1a.

In each of the frame areas FM1a, FM1b, FM2a, FM2b, FM3a and FM3b, data are stored from a lower address to a higher address in each area (bank) of the image memory, taking each of the address start locations AD1a, AD1b, AD2a, AD2b, AD3a and AD3b as the origin, as shown by the arrow in FIG. 16. Therefore, even when each of the frame sizes SZ1a, SZ1b, SZ2a, SZ2b, SZ3a and SZ3b is increased, the image data required for coding or decoding of the image sequence are not destroyed by image data of another image sequence, unless the increased frame size exceeds the size of each bank of the divided memory. Thereby, when the size of the memory area required for coding or decoding of each image sequence is fixed, the structure in which the memory address is divided as shown in FIG. 16 has no problem.

FIG. 17 is a block diagram illustrating a prior art image coding apparatus.

As shown in this figure, a motion estimation/motion compensation (MEMC) unit U1 reads out a reference frame FMout from a memory unit FM for an image signal Vin, performs motion estimation/motion compensation with reference to the reference frame, and outputs a motion vector MV and a motion compensated image Ref. A subtracter U2 calculates the difference between the image signal Vin and the motion compensation frame Ref, and outputs the difference to a discrete cosine transformation (DCT) unit U3. The discrete cosine transformation (DCT) unit U3 performs DCT transformation in block units. A quantization (Q) unit U4 quantizes the result of the transformation. A variable-length coding (VLC) unit U5 subjects the quantized value to variable-length coding and outputs a coded stream Vbin.

On the other hand, the quantized value output by the quantization (Q) unit U4 is subjected to inverse quantization by an inverse quantization (IQ) unit U6. Then, inverse DCT transformation in block units is performed by an inverse discrete cosine transformation (IDCT) unit U7. Thereafter, the output of the inverse discrete cosine transformation (IDCT) unit U7 is added to the motion compensation frame Ref and a frame FMin to be recorded in the memory unit FM is obtained. In coding I frame, the reference frame is not required. In this case, all pixel values of the motion compensation frame Ref are handled as "0".

The sequence identification number ObjID of the image and the size ObjSZ of each frame are input to the memory unit FM. The sequence identification number ObjID of the image is used to specify the sequence of the image. The size ObjSZ of each frame is used to designate the size of the memory area required for recording of the frame FMin to be recorded. For example, in FIG. 16, ObjID and ObjSZ of FM1a are represented as ObjID=1 and ObjSZ=SZ1a. ObjID and ObjSZ of FM2b are represented as ObjID=2 and ObjSZ=SZ2b.

FIG. 18 is a block diagram illustrating a prior art image decoding apparatus. In this figure, a variable-length decoding (VLD) unit U11 subjects a coded stream Vbin to variable-length decoding. An inverse quantization (IQ) unit U6 inversely quantizes the result of the variable-length decoding. An inverse discrete cosine transformation (IDCT) unit U7 subjects the result of the inverse quantization to inverse DCT transformation in block units.

A memory unit FM outputs a reference frame FMout corresponding to the sequence identification number ObjID of the image. A motion compensation (MC) unit U12 performs motion compensation corresponding to a motion vector MV to generate a motion compensation frame Ref. An adder U8 adds the motion compensation frame Ref and the output of the inverse discrete cosine transformation (IDCT) unit U7 to obtain a decoded frame signal Vout. This frame signal Vout is recorded in the memory unit FM as a record frame FMin composed of image data having the size ObjSZ in a memory area designated by the sequence identification number ObjID of the image. The reference frame is not required for decoding of I frame. In this case, all pixels in the motion compensation frame Ref are handled as "0".

FIG. 19 is a block diagram illustrating a prior art image display apparatus. In this figure, an object selector U20 successively instructs the memory unit FM of the number of an image sequence to be displayed as ObjID in accordance with information ObjSel of the image sequence to be displayed which is instructed by the user. An image output FMout output by the memory unit FM in accordance with this instruction is input to a composer U23. Then, this image output FMout is either composed with another image sequence output by the memory unit FM and displayed, or composed with an already determined background frame BG selected by a switch U21, output to a switch U24, and a composed image is displayed. At a time when all image sequences to be displayed have been read from the memory unit FM, the object selector U20 notifies the switch U24 with an end signal ObjEnd that reading of the image sequences to be displayed is ended. Thereby, the switch U24 outputs a composite image to a display device U25 at a timing of a display synchronous signal Display.

In the usual construction, the image decoding apparatus of FIG. 18 and the image display apparatus of FIG. 19 are constructed as an integrated apparatus in many cases. In these cases, the image decoding apparatus of FIG. 18 and the image display apparatus of FIG. 19 often use the memory unit FM commonly, thereby reducing the memory to half as compared with the case where these apparatus are constructed as individual apparatus.

FIG. 20 is a block diagram illustrating a prior art memory unit FM. When data are to be recorded in the memory unit FM, a bank selector M1 specifies a memory bank among divided memory banks corresponding to a sequence identification number ObjID of an image. An address generator M2 generates an address corresponding to a memory area having a size designated by the size ObjSZ of the image. A memory M4 contains a frame signal FMin in the address space.

Similarly, when data are to be read from the memory unit FM, the bank selector M1 specifies a memory area among the divided memory banks corresponding to the sequence identification number ObjID of an image. The address generator M2 generates an address corresponding to a memory area having the size designated by the size ObjSZ of the image. A frame signal FMout is read from the address space of the memory M4.

Accordingly, when the decoding is performed, the reading/writing is performed with alternately utilizing respective frame areas in two memory banks which are adjacent to each other, by using the access function in memory bank units included in the memory unit FM. Thereby, the image sequence corresponding to each object can be decoded.

The memory management method corresponding to the prior art image sequence is constructed as described above. The management of the memory is performed so as to reserve the bank corresponding to two frames of the memory in total which are required for coding or decoding of one image sequence in the memory.

However, in the prior art memory address management method as shown in FIG. 16, when the frame signal which is temporally divided exceeds the maximum value of each memory, this frame signal cannot be recorded. To be specific, the frame does not greatly vary in size in the middle of the image sequence in MPEG1 or MPEG2, while the size of the frame is allowed to vary with time in MPEG4. When the size of the frame signal to be recorded exceeds the size of the divided memory bank, frame data which are required for coding, decoding or display may be erased. When this problem is to be avoided, a sufficient memory bank is reserved so that each of the divided memory banks has the maximum value of the permissible frame size. However, in such a case, an enormous memory capacity is required and accordingly the power consumption of the device involving a memory is increased.

Further, in the prior art, the variation with time in the size of the frame signal is not considered. Therefore, no measures are taken to deal with cases where frame data which are required for decoding or display are erased in the decoding apparatus or display apparatus.

SUMMARY OF THE INVENTION

It is an object of the present invention to provide a memory management method, a memory management apparatus and a memory management program storage medium, which can increase the efficiency of the memory bank and greatly reduce the risk of erasure of frame data which are required for coding, decoding or display.

It is another object of the present invention to realize an image decoding method, an image decoding apparatus, an image decoding program storage medium, an image display method, an image display apparatus and an image display program storage medium, which reduce deterioration of image quality when frame data required for decoding or display are erased, an image decoding method, an image decoding apparatus and an image decoding program storage medium, which can reduce an operation amount, and an image coding method, an image coding apparatus and image coding program storage medium, which perform coding corresponding to the decoding.

Other objects and advantages of the present invention will become apparent from the detailed description and specific embodiments described are provided only for illustration since various additions and modifications within the spirit and scope of the invention will be apparent to those of skill in the art from the detailed description.

A memory management method according to a 1st aspect of the present invention for simultaneously recording image data of first to n-th image sequences (n is an integer which is equal to or larger than 2) in a memory comprises steps of: dividing an area of the memory into first to n/2-th memory address spaces by allocating addresses from ADstart[i] to ADend[i] (i is an integer which satisfies $1 \leq i \leq n/2$) to a i-th memory address space, respectively; using an area from one of ends of ADstart[i] and ADend[i] of the i-th memory address space toward one of a higher and lower memory addresses in the i-th memory address space, as an area in which image data of a k-th image sequence (k=i×2−1) are recorded; and using an area from the other of the ends of ADstart[i] and ADend[i] toward the other of the lower and higher memory addresses in the i-th memory address space, as an area in which image data of a (k+1)-th image sequence are recorded. Therefore, the memory management method of high practical value, which can increase the efficiency of the memory area, and greatly reduce the risk of erasure of frame data which are required for the coding, decoding or display, can be realized.

According to a 2nd aspect of the present invention, the memory management method of the 1st aspect comprises steps of: monitoring when the image data of the k-th image sequence and the image data of the (k+1)-th image sequence are recorded together in the i-th memory address space, whether one of the image data are overwritten by the other of the image data; and notifying outside when image data are read from the memory, whether image data of an image sequence to be read out have been destroyed by the overwriting. Therefore, the memory management method of high practical value, which can increase the efficiency of the memory area, greatly reduce the risk of erasure of frame data which are required for the coding, decoding or display, and notify the outside whether the image of the accessed image sequence is destroyed or not, can be realized.

According to a 3rd aspect of the present invention, the memory management method of the 1st aspect comprises steps of: monitoring when the image data of the k-th image sequence and the image data of the (k+1)-th image sequence are recorded together in the i-th memory address space, whether one of the image data are overwritten by the other of the image data; and referring to priority information of the image sequences which is input from outside when image data are destroyed by the overwriting, and performing the overwriting so as to destroy image data having a lower priority and protecting image data having a higher priority. Therefore, the memory management method of high practical value, which can increase the efficiency of the memory area, greatly reduce the risk of erasure of frame data which are required for the coding, decoding or display, and reduce the deterioration of image quality even when the frame data are erased, can be realized.

An image coding method according to a 4th aspect of the present invention for simultaneously coding image data of first to n-th image sequences (n is an integer which is equal to or larger than 2) comprises a step of: recording predictive image data in the memory which is managed according to the memory management method of the 1st aspect when inter-frame prediction coding is performed. Therefore, the image coding method of high practical value, which can increase the efficiency of the memory area and greatly reduce the risk of erasure of frame data which are required for the coding, can be realized.

An image decoding method according to a 5th aspect of the present invention for simultaneously decoding image data of first to n-th image sequences (n is an integer which is equal to or larger than 2) comprises a step of: recording predictive image data in the memory which is managed according to the memory management method of the 1st aspect when inter-frame prediction decoding is performed. Therefore, the image decoding method of high practical value, which can increase the efficiency of the memory area and greatly reduce the risk of erasure of frame data which are required for the decoding, can be realized.

An image decoding method according to a 6th aspect of the present invention for simultaneously decoding image data of first to n-th image sequences (n is an integer which is equal to or larger than 2) comprises steps of: recording predictive image data in the memory which is managed by the memory management method of the 2nd aspect when inter-frame prediction decoding is performed; and interrupting a decoding process when image data in the memory which are required for the decoding of the image sequence are destroyed, until decoding can be performed without referring to the image data in the memory. Therefore, the image decoding method of high practical value, which can increase the efficiency of the memory area, greatly reduce the risk of erasure of frame data which are required for the decoding, and reduce the deterioration of image quality when the frame data which are required for the decoding are erased, can be realized.

An image decoding method according to a 7th aspect of the present invention for simultaneously decoding image data of first to n-th image sequences (n is an integer which is equal to or larger than 2) comprises steps of: when inter-frame prediction decoding is performed, recording predictive image data in the memory which is managed according to the memory management method of the 3rd aspect so that an important image sequence has a higher priority; and making image data which are required for decoding of the important image sequence hard to be destroyed. Therefore, the image decoding method of high practical value, which can increase the efficiency of the memory area, greatly reduce the risk of erasure of frame data which are required for the decoding, and reduce the deterioration of image quality even when the frame data required for the decoding are erased, can be realized.

An image display method according to an 8th aspect of the present invention for simultaneously displaying image data of first to n-th image sequences (n is an integer which is equal to or larger than 2) comprises a step of: recording image data to be displayed in a memory which is managed according to the memory management method of the 1st aspect. Therefore, the image display method of high practical value, which can increase the efficiency of the memory area and greatly reduce the risk of erasure of frame data which are required for the display, can be realized.

An image display method according to a 9th aspect of the present invention for simultaneously displaying image data of first to n-th image sequences (n is an integer which is equal to or larger than 2) comprises a step of: displaying when image data in a memory which are required for display of the image sequence are destroyed, image data at a latest time which are not destroyed in the image sequence, in place of the destroyed image data. Therefore, the image display method of high practical value, which can increase the efficiency of the memory area, greatly reduce the risk of erasure of frame data which are required for the display, and reduce the deterioration of image quality when the frame data required for the display are erased, can be realized.

A memory management apparatus according to a 10th aspect of the present invention for simultaneously recording image data of first to n-th image sequences (n is an integer which is equal to or larger than 2) in a memory comprises: a memory division unit for dividing an area in the memory into first to n/2-th memory address spaces by allocating addresses from ADstart[i] to ADend[i] (i is an integer which satisfies $1 \leq i \leq n/2$) as a i-th memory address space, respectively; and an address generation unit for generating an address for using an area from one of ends of ADstart[i] and ADend[i] of the i-th memory address space toward one of a higher and lower memory address in the i-th memory address, as an area in which image data of a k-th image sequence ($k=i\times2-1$) are recorded, and using an area from the other of the ends of ADstart[i] and ADend[i] toward the other of the lower and higher memory address of the i-th memory address space as an area in which image data of a (k+1)-th image sequence are recorded. Therefore, the memory management apparatus of high practical value, which can increase the efficiency of the memory area and greatly reduce the risk of erasure of frame data which are required for the coding, decoding or display, can be realized.

According to an 11th aspect of the present invention, there is provided a memory management program storage medium which contains a memory management program for implementing a memory management method for simultaneously recording image data of first to n-th image sequences (n is an integer which is equal to or larger than 2) in a memory, and this memory management program implementing the memory management method of: dividing an area in the memory into first to n/2 memory address spaces by allocating addresses from ADstart[i] to ADend[i] (i is an integer which satisfies $1 \leq i \leq n/2$) to a i-th memory address space, respectively; using an area from one of ends of ADstart[i] and ADend[i] of the i-th memory address space toward one of a higher and lower memory addresses in the i-th memory address space, as an area in which image data of a k-th image sequence (k=i×2−1) are recorded; and using an area from the other of ends of ADstart[i] and ADend[i] toward the other of the lower and higher memory addresses in the i-th memory address space, as an area in which image data of a (k+1)-th image sequence (k=i×2−1) are recorded. Therefore, the program storage medium containing a program which enables a computer to execute a memory management method of high practical value, which can increase the efficiency of the memory area and greatly reduce the risk of erasure of frame data which are required for the coding, decoding or display, can be provided.

In a memory management apparatus according to a 12th aspect of the present invention, when newly input image data are to be stored in a memory area which is a free space or contains i pieces of image data (i is an integer from 1 to 3), in a case where image data can be stored on at least one of a lowest side and a highest side of an address of the memory area, the newly input image data are stored on one of the lowest side and highest side of the address of the memory area; and in a case where image data cannot be stored in either the lowest side nor highest side of the address of the memory area, the newly input image data are stored in an intermediate part therebetween, whereby storage of the memory is managed, and the storage of the newly input image data in the intermediate part is either storing the newly input image data in an area which is adjacent to one of the image data which have been stored on the highest side and lowest side, or storing the newly input image data in an area which is adjacent to an address central location in the memory area. Therefore, the efficiency of the memory can be increased and the risk of the decoding incapability due to the exhaustion of the memory required for the decoding can be greatly reduced.

According to a 13th aspect of the present invention, in the memory management method of the 12th aspect, in a case where the image data which have been stored in the memory area and the newly input image data are all rectangular-shaped image data, when image data are to be stored in the intermediate part, memory areas for already stored image data are relocated so that the newly input image data are stored in an area which is adjacent to one of the image data which have been stored on the highest side and lowest side. Therefore, a larger memory amount can be reserved, whereby the efficiency of the memory can be increased and the risk of the decoding incapability due to the exhaustion of the memory required for the decoding can be greatly reduced.

According to a 14th aspect of the present invention, in the memory management method of the 13th aspect, the relocation of the memory areas for the already stored image data is performed only when there is not an enough memory area for the newly input image data. Therefore, the execution times of the data relocation process having a high risk of interruption of the decoding process can be reduced, whereby the efficiency of the memory can be increased as well as the risk of decoding incapability due to exhaustion of the memory required for the decoding can be greatly reduced. Accordingly, the memory management method of high practical value can be realized.

According to a 15th aspect of the present invention, in the memory management method of the 12th aspect, in a case where at least one among the image data stored in the memory area and the newly input image data is an arbitrary-shaped image data, when image data are to be stored in the intermediate part, memory areas for already stored image data are relocated so that the newly input data are stored in an area which is adjacent to an address central location in the memory area. Therefore, even when the size of an individual object varies in some degree, the memory area can be dynamically reserved, whereby the risk of the decoding incapability due to the exhaustion of the memory required for the decoding can be greatly reduced.

According to a 16th aspect of the present invention, in the memory management method of the 15th aspect, the relocation of the memory areas for the already stored image data is performed only when there is not an enough memory area for the newly input image data. Therefore, the execution times of the data relocation process having a high risk of interruption of the decoding can be reduced, whereby the efficiency of the memory can be increased as well as the risk of the decoding incapability due to the exhaustion of the memory required for the decoding can be greatly reduced. Accordingly, the memory management method of high practical value can be realized.

According to a 17th aspect of the present invention, in the memory management method of the 12th aspect, while the memory is being managed so as to store the newly input image data in an area which is adjacent to one of the image data which have been stored on the highest side and lowest side when image data are to be stored in the intermediate part, in a case where arbitrary-shaped image data are newly input, memory areas for already stored image data are relocated so that the newly input image data are stored in an area which is adjacent to the address central location in the memory area when the image data are to be stored in the intermediate part. Therefore, a larger memory amount can be reserved until an arbitrary-shaped object is input. In addition, after the arbitrary-shaped object is input, the sum of the memory amounts between two objects can be freely changed within the upper limit. Accordingly, the sufficient memory area for the decoding can be used with less relocation of data in the memory.

According to a 18th aspect of the present invention, in the memory management method of the 17th aspect, after the relocation of the memory areas resulting from input of the arbitrary-shaped image data, only when there is not an enough memory area for a newly input image data, the memory areas for the already stored image data are relocated so that the newly input image data are stored in an area which is adjacent to the address central location in the memory area when the image data are to be stored in the intermediate part. Therefore, the execution times of the data relocation process having a high risk of interruption of the decoding can be reduced, whereby the efficiency of the memory can be increased as well as the risk of the decoding incapability due to the exhaustion of the memory required for the decoding can be greatly reduced. Therefore, the memory management method of high practical value can be realized.

DETAILED DESCRIPTION OF THE PREFERRED EMBODIMENTS

Hereinafter, embodiments of the present invention will be described with reference to the drawings.

[Embodiment 1]

According to this first embodiment, in the memory management method, data of two image sequences are recorded on higher address sides and lower address sides, respectively, in two memory banks which are adjacent to each other, thereby increasing the efficiency of the memory bank.

Figure 1:
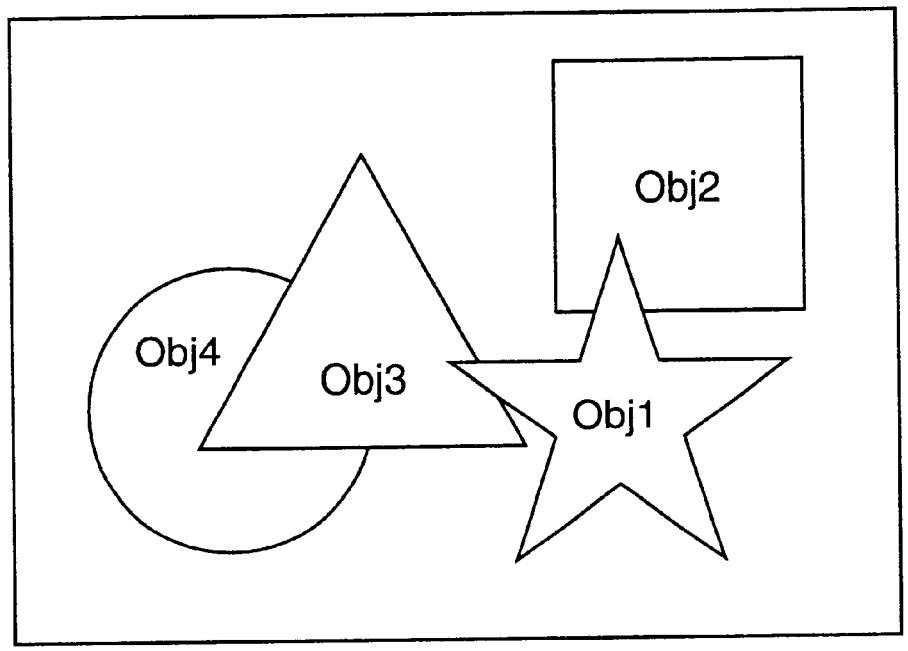
FIG. 1 is a diagram showing an example of an image composed of plural image sequences.

FIG. 1 is a diagram showing an example of an image composed of plural image sequences. Obj1, Obj2, Obj3 and Obj4 denote image sequences, respectively. As shown in FIG. 1, four image sequences Obj1, Obj2, Obj3 and Obj4 are coded in image sequence units, and the respective image sequences are composed and displayed as one frame by an image display apparatus. Naturally, the size of the frame of each image sequence is increased or decreased with time. Accordingly, in MPEG4, "the upper limit of the sum" of the sizes of the frames of all image sequences at an arbitrary time is previously decided to set a memory capacity which is required for a reference frame in the inter-frame prediction coding.

Since the image which is obtained by composing the respective image sequences is displayed, the sum of the sizes of the frames of all the image sequences varies with time in a relatively small amount even in consideration of overlapping parts of objects (the total of the reference memory amounts required for all the image sequences is usually about 1.5 times as large as the displayed frame). Therefore, the necessary memory capacity can be reduced as compared with the case where the upper limit of the size of the frame is set for each image sequence (for example, the size of the displayed frame is set as the upper limit for each image sequence).

Figure 2:
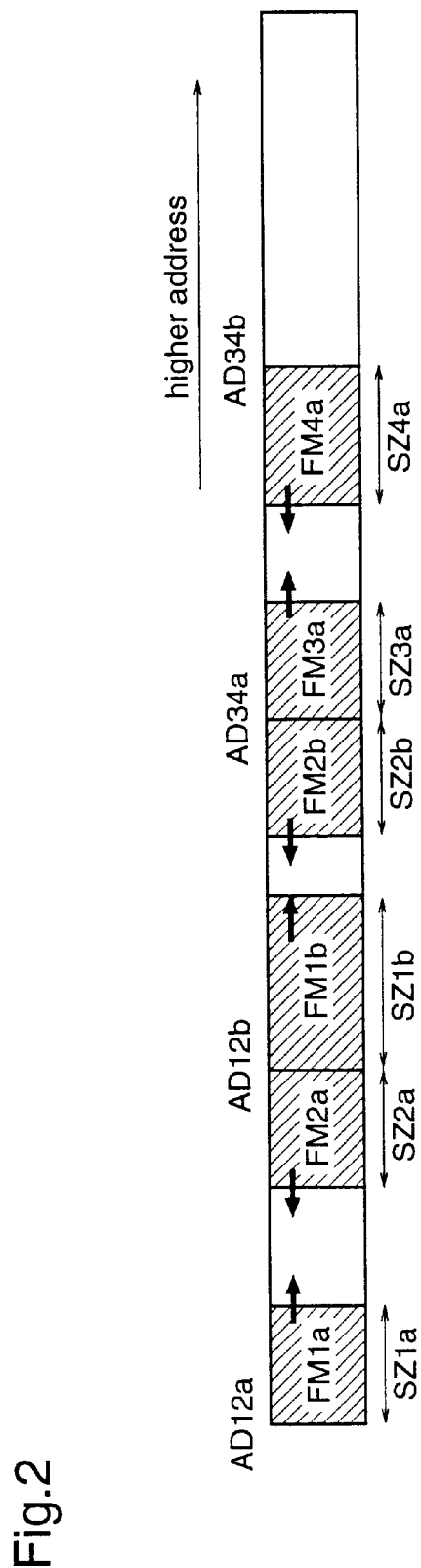
FIG. 2 is a diagram showing an example where a memory address is divided on the basis of a memory management method of a first embodiment of the present invention.

FIG. 2 is a diagram showing an example where a memory address is divided according to the memory management method of the first embodiment. FIG. 2 shows a state where the first image sequence and the second image sequence are recorded in the same memory bank.

In FIG. 2, FM1$a$, FM1$b$, FM3$a$ and FM4$a$ denote the first frame area of the first image sequence, the second frame area of the first image sequence, the first frame area of the third image sequence and the first frame area of the fourth image sequence, respectively. In addition, AD12$a$, AD12$b$, AD34$a$ and AD34$b$ denote the first address start location of the first image sequence, the second address start location of the first image sequence, the first address start location of the third image sequence and the second address start location of the third image sequence, respectively. AD12$a$ to AD12$b$-1 corresponds to the first memory bank. AD12$b$ to AD34$a$-1 corresponds to the 1$a$-th memory bank. AD34$a$ to AD34$b$-1 corresponds to the 2$a$-th memory bank.

The frame sizes SZ1$a$ and SZ1$b$ of the first image sequence are reserved from the start locations AD12$a$ and AD12$b$ toward the higher addresses, respectively. The frame size SZ3$a$ of the third image sequence is reserved from the start location AD34$a$ toward the higher address. On the other hand, the frame sizes SZ2$a$ and SZ2$b$ of the second image sequence are reserved from the start locations AD12$b$-1 and AD34$a$-1 toward the lower addresses, respectively. In addition, the frame size SZ4$a$ of the fourth image sequence is reserved from the start location AD34$b$-1 toward the lower address.

Actually, the frame sizes SZ2$a$ and SZ2$b$ of the second image sequence and the frame size SZ4$a$ of the fourth image sequence are already known. Therefore, addresses AD12$b$–SZ2$a$, AD34$a$–SZ2$b$ and AD34$n$–SZ4$a$ which are obtained by subtracting values corresponding to the frame sizes SZ2$a$, SZ2$b$ and SZ4$a$ from the start locations AD12$b$-1, AD34$a$-1 and AD34$b$-1, respectively, are previously calculated. Then, the frame sizes are reserved from these addresses toward the higher address, respectively.

Figure 15:
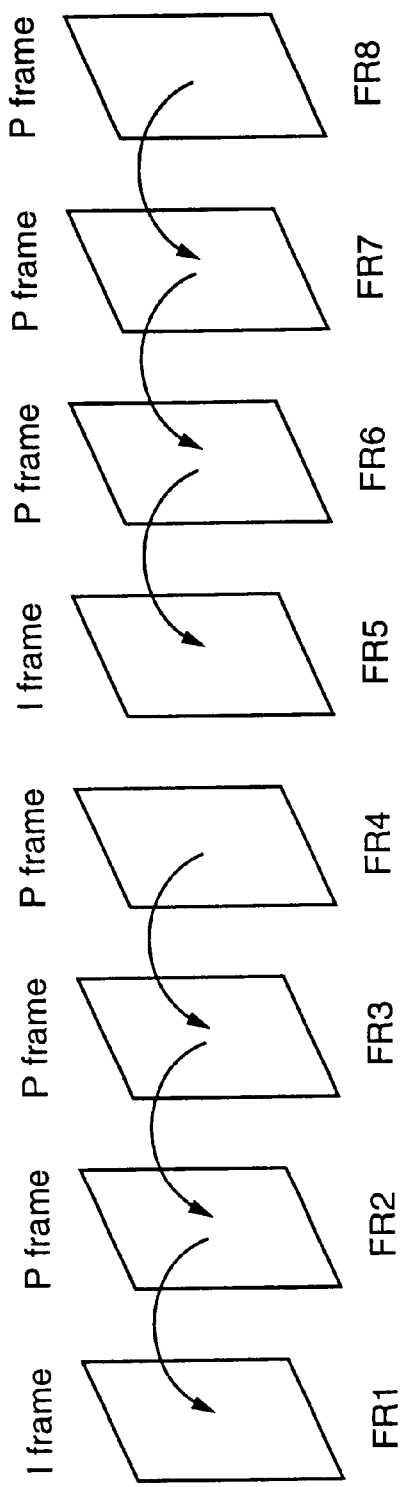
FIG. 15 is a diagram showing a typical example of MPEG coding.
Figure 16:
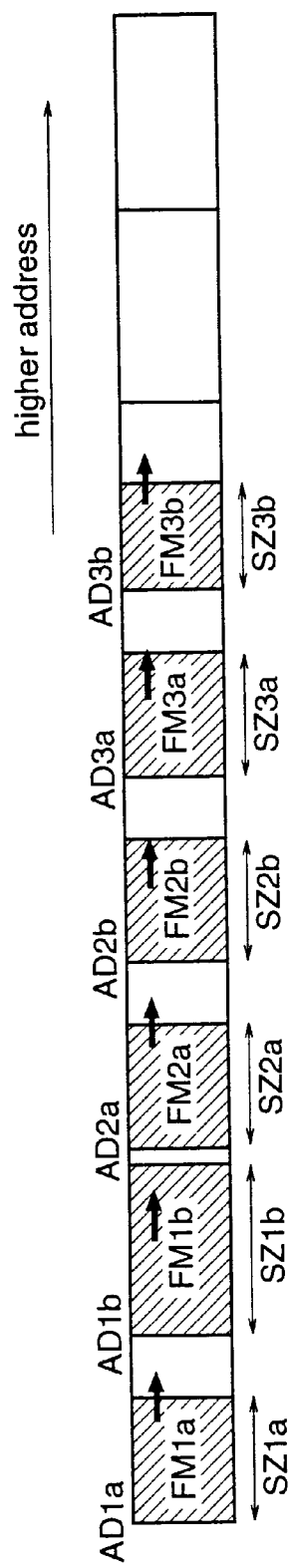
FIG. 16 is a diagram showing a prior art where the memory address is divided.

The way of storing image data of each image sequences is described taking the case where the frames FR1, FR2, . . . , and FR8 shown in FIG. 15 are decoded as an example.

These frames FR1, FR2, . . . , and FR8 constitute one image sequence corresponding to one object (assuming the first image sequence).

Initially, the frame FR1 as the first I frame in the first image sequence is decoded and a decoded image data is stored in the frame area FM1$a$. This frame area FM1$a$ is located on the side of the address start location AD12$a$, i.e., on the lower address side of the 1$a$-th memory address space.

Next, the frame FR2 is decoded with referring to the decoded image data of the frame FR1 which has been stored in the frame area FM1$a$, and the decoding result is stored in the frame area FM1$b$. This frame area FM1$b$ is located on the side of the address start location AD12$b$, i.e., on the lower address side in the 1$b$-th memory address space.

Then, the frame FR3 is decoded with referring to the decoded image data of the frame FR2 which has been stored in the frame area FM1$b$ in the 1$b$-th memory address space, and the decoding result is stored in the frame area FM1$a$ in the 1$a$-th memory address space. This is because the image data of the frame FR1 is no longer required for decoding the frame FR3 and therefore the data in the frame area FM1$a$ can be overwritten by other data.

Further, the frame FR4 is decoded with referring to the decoded image data of the frame FR3 which has been stored in the frame area FM1$a$, and the decoding result is stored in the frame area FM1$b$.

Thereafter, the frames FR5 to FR8 of the first image sequence are decoded similarly with alternately using two frame areas FM1$a$ and FM1$b$ which are allocated on the lower address sides of the 1$a$-th and 1$b$-th memory banks adjacent to each other, respectively.

Here, I frame or P frame is referenced to decode P frame or B frame, while B frame is not referenced to decode another B frame or P frame. Therefore, B frame is not stored in the memory.

Accordingly, when B frame exists between the frame FR2 and the frame FR3, B frame is decoded with referring to the frame FR2 which has been stored in the frame area FM1$b$ and the frame FR3 which has been stored in the frame area FM1$a$.

The frames of the second or third image sequence are similarly decoded, respectively. To be specific, the frames of the second image sequence are decoded, respectively, alternately using two frame areas FM2$a$ and FM2$b$ which are allocated on the higher address sides of the 1$a$-th and 1$b$-th memory banks adjacent to each other, respectively. The frames of the third image sequence are decoded, respectively, alternately using two frame areas FM3$a$ and FM3$b$ (FM3$b$ is adjacent to FM4$a$ in FIG. 2 on the right, but not shown in this figure) which are allocated on the lower address sides of the 2$a$-th and 2$b$-th memory banks adjacent to each other, respectively.

Also when the coding such as inter-frame prediction coding or the display of images is performed, the coding or image display is similarly performed be alternately using two frame areas which are adjacent to each other in the memory.

The characteristics of this memory management method are following two points:
Recording frames of difference image sequences in one memory bank; and
Recording the frames of one of the image sequences on the lower address side and the frames of the other of the image sequences on the higher address side in one memory bank.

Therefore, in the above-mentioned example of the decoding, the first image sequence is alternately recorded in FM1$a$ and FM1$b$, and the second image sequence is alternately recorded in FM2$a$ and FM2$b$. However, as long as the above-mentioned two points are satisfied, arbitrary frame areas in the memory bank can be used. For example, the first image sequence can be alternately recorded in FM1$a$ and FM2$b$ and the second image sequence can be alternately recorded in FM2$a$ and FM1$b$.

As already described, the upper limit of the sum of the sizes of frames of all image sequences is decided in MPEG4. Therefore, variation in the sum of the sizes of frames of plural image sequences, which are coded in accordance with the coding rule of MPEG4, becomes smaller than variation in the size of each frame. In the example as shown in FIG. 2, recorded frames are not damaged by overwriting as long as the sum of the sizes of the frames of the first image sequence and second image sequence does not exceed the size of the memory bank.

Figure 3:
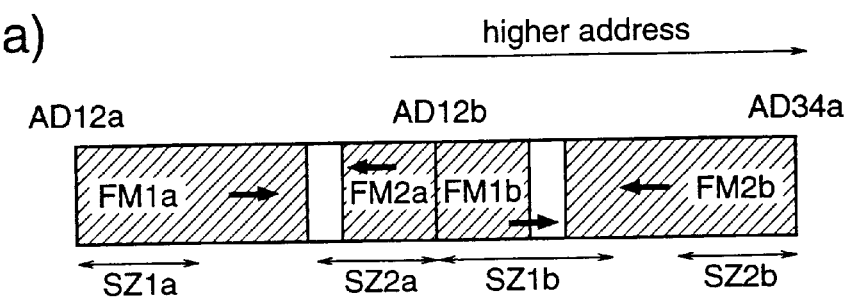
FIGS. 3(a) and 3(b) are diagrams showing examples where a memory address is divided on the basis of the memory management method of the first embodiment of the present invention.
Figure 3:
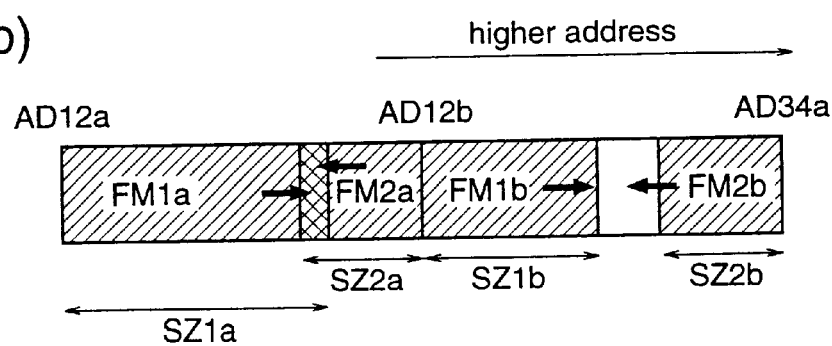

Therefore, even when the frame area FM1$a$ occupies a large area or the frame area FM2$b$ occupies a large area in the bank as shown in FIG. 3($a$), when the sizes of frames of the other image sequence are small, the recorded frames are not damaged. The reserved memory area is freed at a time when this area becomes useless (when the reference by the prediction coding is completed in the coding or decoding, or the output to a display device is completed in the image display), and then reused as an area in which the next frame is recorded.

However, when the sufficient size of the memory bank is not reserved, even when the sum of the frame sizes of all the image sequences is lower than the upper limit, the sum of the two image sequences among those may be increased as shown in FIG. 3(b). In the example as shown in FIG. 3(b), parts of the memory areas of the frame areas FM1a and FM2a are overlapped with each other. Therefore, damages to one of the frame data cannot be avoided. In this case, the damaged frame is detected and then suitable image concealment (described later) is performed in the step of decoding or displaying, whereby the deterioration of image quality is reduced.

As described above, according to the memory management method corresponding to plural image sequences according to the first embodiment, the image data of objects of the different sequences are recorded on the lower address side and higher address side in each memory bank, respectively. Therefore, the memory management method which can greatly reduce the frequency with which data of one of two objects are destroyed by data of the other of the two objects when the data of the two objects are recorded, increase the efficiency of the memory bank, reduce the power consumed in cases where the memory is incorporated in devices, and greatly reduce the risk of erasure of frame data required for the decoding or display can be obtained.

The present invention is useful particularly in a device which can mount only a small-capacity memory due to the restrictions such as the power consumed by portable terminals or the like.

[Embodiment 2]

The second embodiment describes a structure of a memory management apparatus (memory unit) for realizing the memory management method according to the first embodiment.

Figure 4:
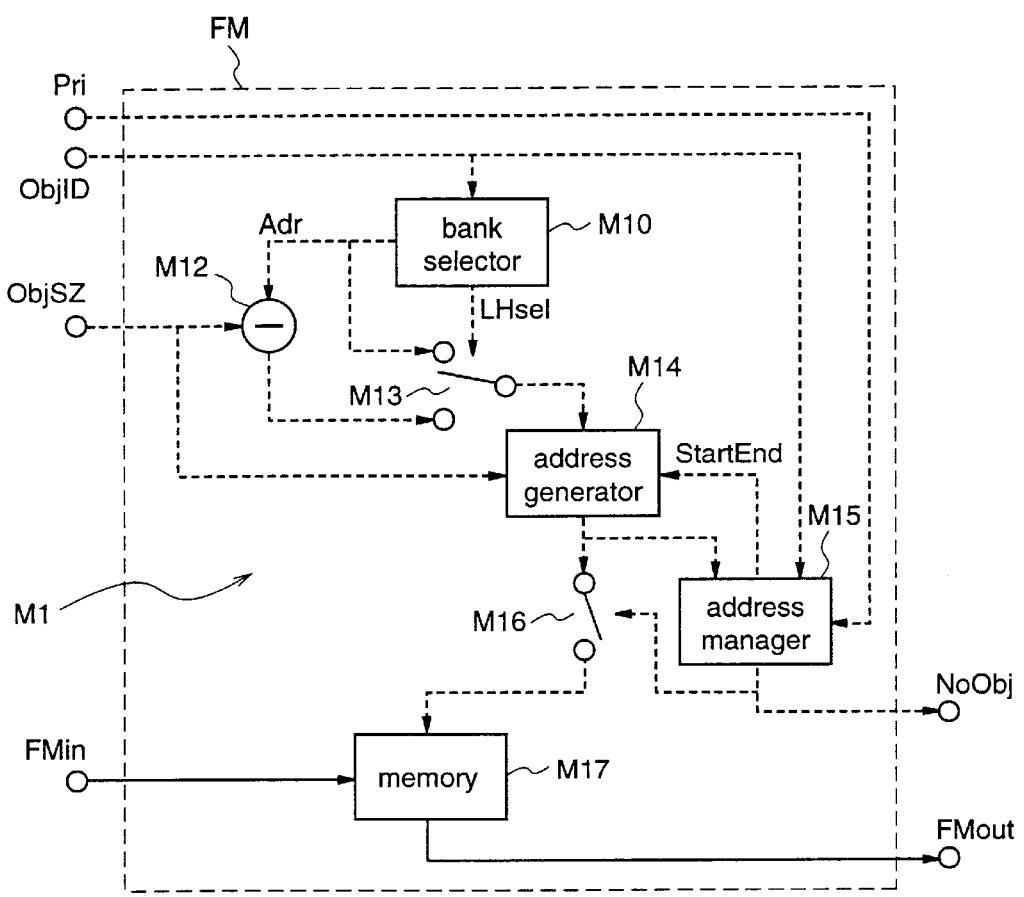
FIG. 4 is a block diagram illustrating a memory unit according to a second embodiment.
Figure 20:
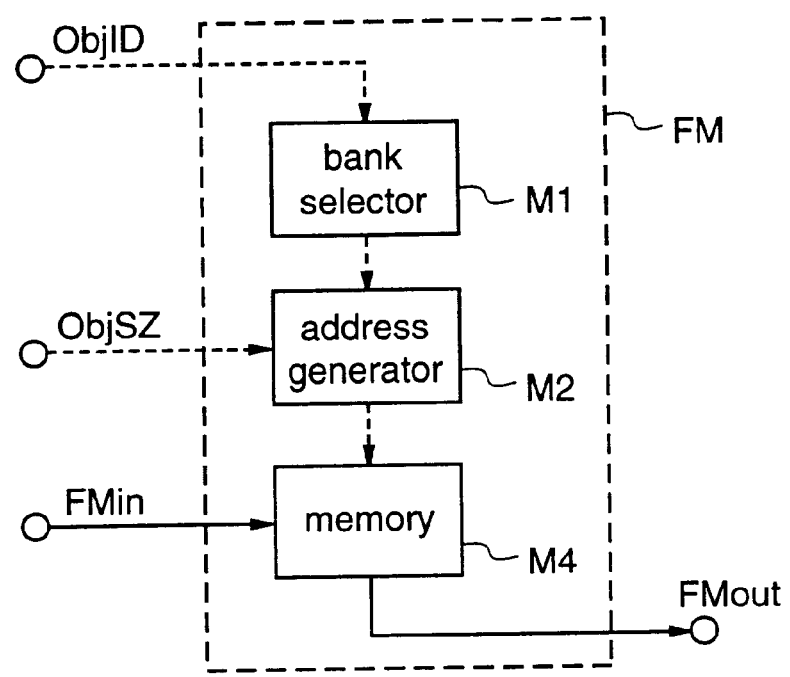
FIG. 20 is a block diagram illustrating a prior art memory unit.

FIG. 4 is a block diagram illustrating the memory unit according to the present invention. In this figure, the same reference numerals as those in the block diagram of FIG. 20 illustrating the prior art memory unit denote the same or corresponding parts, and those parts are not described here.

In the figure, M10 denotes a bank selector for specifying a memory bank as well as notifying the lowest address or highest address Adr of the memory bank. The bank selector M10 corresponds to a memory area division means. M12 denotes a subtracter for performing subtraction between the highest address or lowest address Adr of the memory bank notified by the bank selector M10, and the size ObjSZ of the frame. M13 denotes a switch which is provided between the bank selector M10 and a memory address generator M14 and selects one of the address Adr output by the memory bank and the output of the subtracter M12. M14 denotes the address generator, and this address generator M14 corresponds to an address generation means. M15 denotes an address manager for performing address management on the basis of the priority Pri and the sequence identification number ObjID of frame data. The address manager M15 corresponds to a record monitoring means, a destruction notifying means and a data protecting means. M16 denotes a switch which is provided between the address generator M14 and a memory M17 and is switched on or off on the basis of output NoObj of the address manager M15. A memory management apparatus M1 comprises the bank selector M10, the subtracter M12, the switch M13, the address generator M14, the address manager M15 and the switch M16. M17 denotes a memory which is managed by the memory management apparatus M1. FM denotes a memory unit (hereinafter, referred to as only a memory) comprising a memory management apparatus M1 and the memory M17.

Next, the operation of the memory management apparatus will be described. Initially, the operation at the recording time is described. The bank selector M10 as the memory area division means specifies a memory bank corresponding to the sequence identification number ObjID of the image among divided memory banks. This is performed by dividing the whole address space of the memory M17 into memory address spaces corresponding to addresses from ADstart[i] to ADend[i] (i is an integer which satisfies $1 \leq i \leq n$). Two ObjID (i.e., frames of two image sequences) are recorded in each of the memory banks. In this case, the bank selector M10 notifies the lowest address of the memory bank as Adr in the case of the frame to be recorded on the lower address side of the memory bank, and notifies the highest address of the memory bank as Adr in the case of the frame to be recorded on the higher address side in the memory bank. In addition, the bank selector M10 instructs one of the higher address side and the lower address side in the memory bank, on which the frame is to be recorded, with a selection signal Lhse1.

In the memory management apparatus according to the second embodiment, a reference image storage memory and a decoding image storage memory are separately described. Therefore, the bank selector M10 as the memory area division means divides the whole address space of the memory M17 into n pieces of memory address space corresponding to addresses from ADstart[i] to ADend[i] (i is an integer which satisfies $1 \leq i \leq n$). However, when attentions are given to one of the reference image storage memory and the decoding image storage memory in this memory management method, the bank selector M10 as the memory area division means included in the memory management apparatus divides the whole address space of the memory M17 into n/2 pieces of memory address space corresponding to addresses from ADstart[i] to ADend[i] (i is an integer which satisfies $1 \leq i \leq n/2$).

The bank selector M10 operates so as to select the memory area which was used for the same image sequence identification number ObjID in the past and is being freed at present. Therefore, when the recording location of the frame is on the lower address side of the memory bank, the lowest address of the memory bank is input to the address generator M14 by the switch M13. On the other hand, when the recording location of the frame is on the higher address side of the memory bank, the value which is obtained by subtracting the size ObjSZ of the frame from the highest address in the memory bank is selected by the switch M13 and input to the address generator M14. The address generator M14 as the address generation means specifies the memory locations in the rage of the size ObjSZ from the address location which is selected by the switch M13 to use the memory locations as an area in which the image of the i-th image sequence is recorded from the frame data ADstart[i] input to the memory M17 from the outside toward the higher memory address, as well as use the memory locations as an area in which the image of the (i+1)-th image sequence is recorded from the frame data ADend[i] toward the lower memory address.

The address manager M15 as the record monitoring means monitors whether one of the image of the i-th image sequence and the image of the (i+1)-th image sequence destroys the other when these images are recorded in one address space. This is performed by monitoring the address which is output by the address generator M14 and examining whether the frames of the different image sequence identification numbers ObjID are written in the same address location. When the frames of the different image sequence identification numbers ObjID are to be written in the same address location, the priority Pri of the frame data to be written is compared with the priority Pri of the frame data which has already been written. When the priority Pri of the frame data to be written is higher than the priority Pri of the frame data which has been written, the address manager M15 as the data protecting means turns the switch M16 ON and executes the writing onto the memory M17. On the other hand, when the priority Pri of the frame data to be written is lower than the priority Pri of the frame data which has already been written, the address manager M15 turns the switch M16 OFF and interrupts the writing onto the memory M17.

The priority Pri of the frame data is previously given by the creator of the contents. For example, a lower priority is given to the background or the like and a higher priority is given to images of objects in a frame. Accordingly, the data having the higher priority is written on the memory M17 and protected, while the data having the lower priority is destroyed without being written on the memory. Therefore, the complete decoding operation or display operation must be interrupted. However, since the destroyed data has the lower priority, when the decoding operation or display operation is performed without referring to the destroyed data, the decoding or display can be performed only with the deterioration of the image quality to such an extent that the clarity of the image is slightly reduced, i.e., there is no harm in practical use.

In cases where the frames of the different image sequence identification numbers ObjID are written in the same address location, whether the switch M16 is turned OFF or ON when their priorities Pri are the same or the priorities Pri are not given from the outside is previously decided uniquely.

Next, the operation at the reading time is described. The address manager M15 instructs the address generator M14 on the start/end location of the memory address corresponding to the image sequence identification number ObjID using a location signal StartEnd on the basis of the output of the address generator M14 which performs monitoring at the recording time. The address generator M14 instructs the memory M17 on the memory address in accordance with the location signal StartEnd, and desired frame data are output from the memory M17 as Fmout.

The address manager M15 as the destruction notifying means contains whether the frame data corresponding to the image sequence identification number ObjID to be read have been destroyed or not by data of another image sequence on the basis of the output of the address generator M14 which has been monitored at the recording time. Therefore, when the frame data instructed by the image sequence identification number ObjID is destroyed, the address manager M15 notifies the outside that this is destroyed image data using NoObj. Accordingly, whether the image of the accessed image sequence is destroyed or not can be notified when the image data is read from the memory.

When the address manager M15 has a function of holding the address of a frame data at the latest time which has the same image sequence identification number ObjID and is not destroyed, a frame of the same image sequence which is desirable as an alternate frame and temporally near can be read from the memory M17 by instructing the address of the frame data at the latest time which is not destroyed as StartEnd and turning the switch M16 ON. NoObj also can notify that the alternate frame is output.

According to the above-mentioned structure, the memory management apparatus which can realize the memory management method of the first embodiment as hardware, can greatly reduce the frequency with which data of one of two objects is overwritten and destroyed by data of the other of the two objects when data of the two objects are to be recorded, increase the efficiency of the memory bank to reduce the power consumed when the memory is incorporated in devices, and greatly reduce the risk of erasure of frame data which are required for coding, decoding or display, as well as can monitor whether or not image data of one of the image sequences is destroyed by image data of the other of the image sequences when images of two different image sequences are recorded in the same memory address space, notify the outside that destruction is caused in cases of destruction, destroy data having a lower priority and protect data having a higher priority when the destruction is caused can be obtained.

Figure 17:
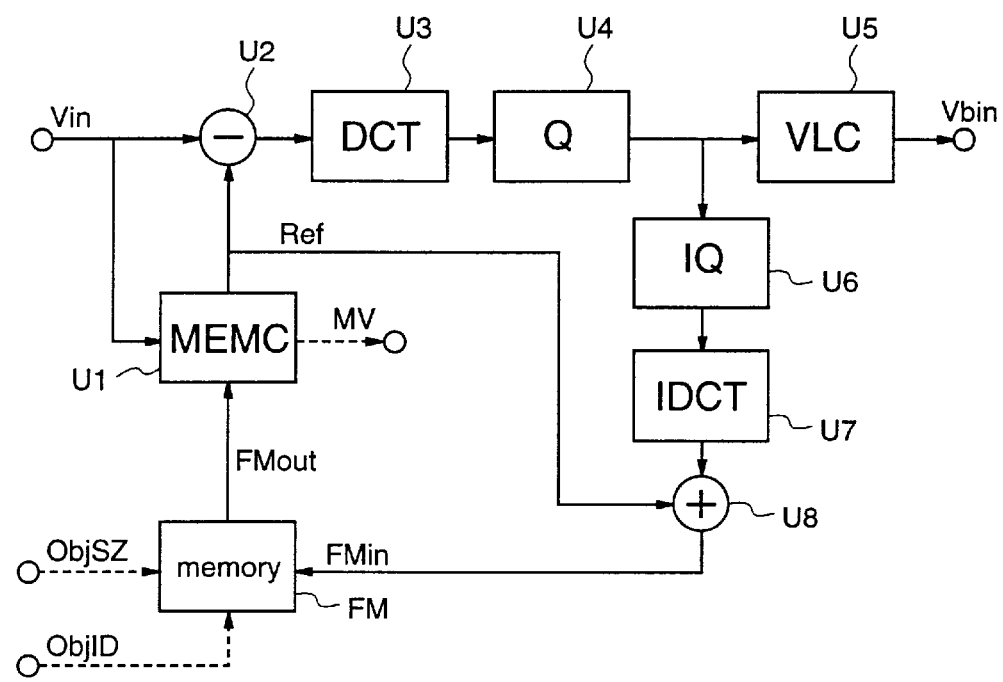
FIG. 17 is a block diagram illustrating an image coding apparatus according to the prior art, the second, fifth, seventh or ninth embodiment.
Figure 18:
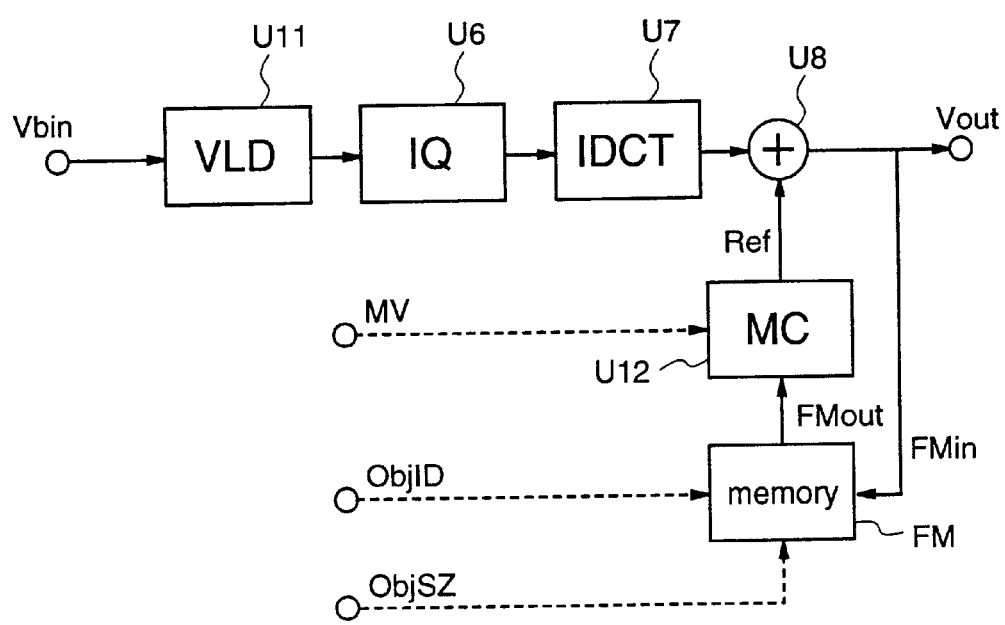
FIG. 18 is a block diagram illustrating an image decoding apparatus according to the prior art, the second, fifth, seventh or ninth embodiment.
Figure 19:
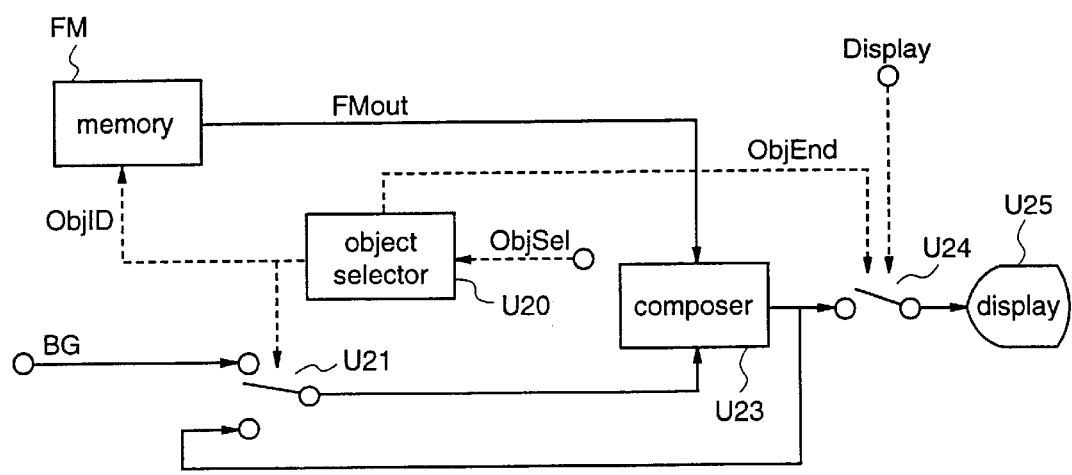
FIG. 19 is a block diagram illustrating an image display apparatus according to the prior art, the second, fifth, seventh or ninth embodiment.

In addition, when the memory FM in the image coding apparatus of FIG. 17, the image decoding apparatus of FIG. 18 and the image display apparatus of FIG. 19 is replaced with the memory management apparatus of FIG. 4, an image coding apparatus, an image decoding apparatus and an image display apparatus which can greatly reduce the frequency with which data of one of two objects is destroyed by data of other of the two objects when data of the two objects are recorded in a memory when coding, decoding or display of images is to be performed, increase the efficiency of the memory bank to economize on the memory amount as compared with the prior art memory unit, and greatly reduce the power consumed when the memory is incorporated in devices, as well as can monitor whether one of images of two different image sequences is destroyed by the other of the images of the two different image sequences when the images of the two different image sequences are recorded in the same memory address space, notify the outside that destruction is caused in cases of destruction, and destroy data having a lower priority and protect data having a higher priority when the destruction is caused can be constructed.

The present invention is useful particularly in a device on which only a memory of a small capacity can be mounted due to restrictions such as the power consumed by a portable terminal or the like.

[Embodiment 3]

The third embodiment describes an execution procedure when the recording to the memory in the memory management apparatus according to the second embodiment is realized by software.

Figure 5:
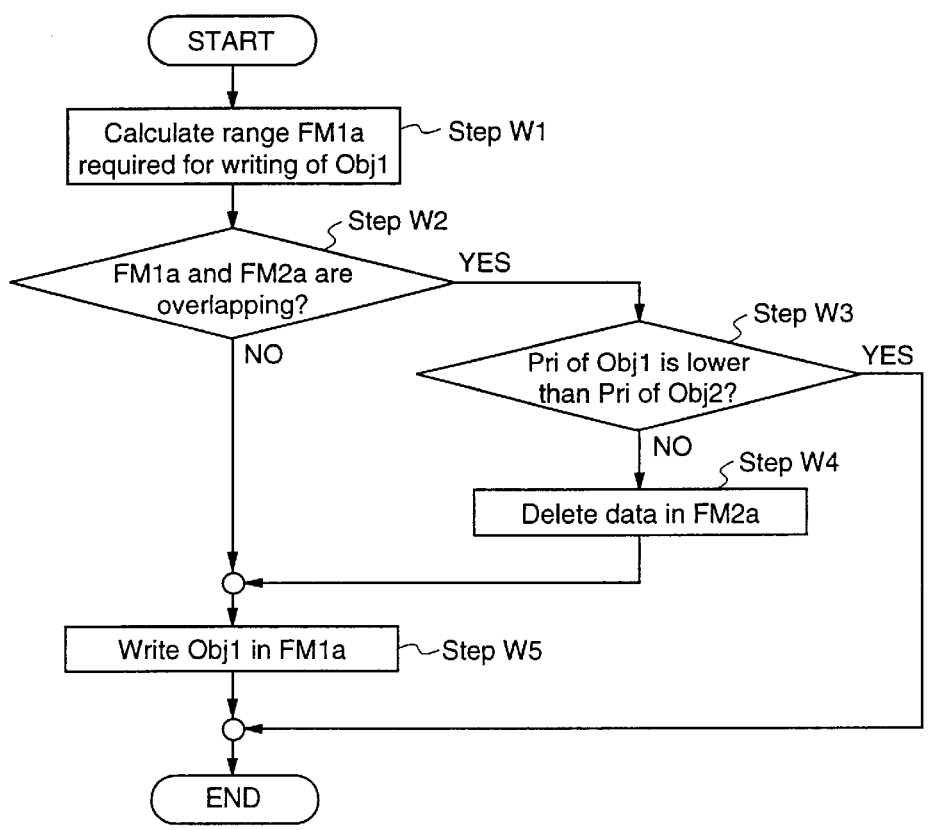
FIG. 5 is a flowchart showing the case where a recording procedure of a memory unit according to a third embodiment is realized by software.

FIG. 5 is a flowchart showing the case where the recording procedure of the memory unit according to the present invention is realized by software. This figure shows the procedure of recording a frame Obj1 of an image sequence 1 when the frame Obj1 and a frame Obj2 of an image sequence 2 are to be recorded in the same memory bank in the case where the memory address is divided as shown in FIG. 2.

Initially, a range FM1*a* of the memory which is required for recording the frame Obj1 is calculated (step W1). Next, it is examined whether the address of FM1*a* and a memory area which is used by the frame Obj2 are overlapping with each other (step W2). When they are overlapping, the priority Pri of Obj1 is compared with the priority Pri of Obj2 (step W3). When the priority Pri of Obj1 is lower than the priority Pri of Obj2, the procedure is completed with no data being written. Otherwise, the memory of FM2a in which Obj2 has been recorded is released and reserved as a memory area of Obj1 (step W4). Finally, the frame data is recorded in the memory area of FM1a (step W5) and the procedure is ended.

As described above, the recording procedure of the memory unit which is described in the second embodiment can be realized by software. Accordingly, the memory management method which can greatly reduce the frequency with which data of one of two objects is destroyed by data of the other of the two objects when data of the two objects are to be recorded, increase the efficiency of the memory bank to reduce the power consumed in cases where the memory is incorporated in devices, and greatly reduce the risk of erasure of the frame data required for coding, decoding or display can be obtained.

[Embodiment 4]

The fourth embodiment describes an execution procedure in cases where the reading procedure of the memory management apparatus according to the second embodiment is realized by software.

Figure 6:
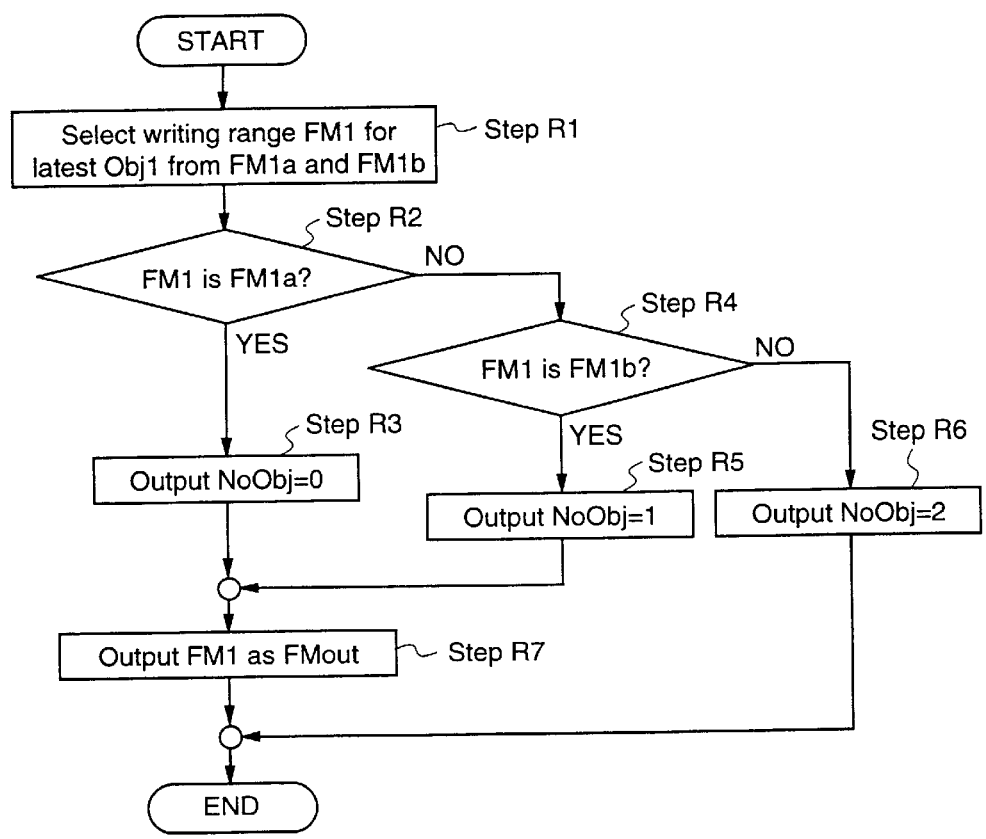
FIG. 6 is a flowchart showing the case where a reading procedure of a memory unit according to a fourth embodiment is realized by software.

FIG. 6 is a flowchart showing the case where the reading procedure of the memory unit according to the present invention is realized by software. In FIG. 6, assume that the frame Obj1 of the image sequence 1 and the frame Obj2 of the image sequence 2 are recorded in the same memory bank and a frame which is to be read out is recorded in FM1a, in the example where the memory address is divided as shown in FIG. 2.

Initially, a memory area in which the latest Obj1 is recorded is selected from FM1a and FM1b as a writing range FM1 (step R1). Next, it is judged whether FM1 is FM1a (step R2). Normally FM1a should be selected, but when FM1a is destroyed, FM1b is selected in place of FM1a. When FM1 is FM1a, FM1a is not destroyed. Therefore, NoObj is set to be "0" to notify the outside that FM1a can be read correctly (step R3). Otherwise, it is judged whether FM1 is FM1b (step R4). When FM1 is FM1b, NoObj is set to be "1" to notify the outside that FM1a is destroyed and FM1b is output in place of FM1a (step R5). When FM1 is neither FM1a nor FM1b, NoObj is set to be "2" to notify the outside that all of the image sequences are destroyed (step R6). Finally, FM1 is output as a readout frame FMout (step R7). Since FM1 is the latest frame which is not destroyed, even when NoObj=1, a frame having a relatively smaller deterioration in image quality is output even if FM1 is used for display as an alternative to the original frame.

Here, the values of NoObj are merely shown as examples. Therefore, other values can be used. Further, plural signals having the same meanings (for example, the result of judgement as to whether FM1 is equal to FM1a and whether FM1 is output as FMout) can be used.

In this way, the reading procedure of the memory unit which is described in the second embodiment can be realized by software. Accordingly, the reading method corresponding to the memory management method which can greatly reduce the frequency with which data of one of two objects is destroyed by data of the other of the two objects when data of the two objects are to be recorded, increase the efficiency of the memory bank to reduce the power consumed in cases where the memory is incorporated in devices, and greatly reduce the risk of erasure of frame data which are required for coding, decoding or display can be realized. Therefore, information as to whether the readout data are destroyed or not can be output together.

In addition, when the memory management method (reading procedure) as shown in FIG. 6 is combined with the memory management method (writing procedure) as shown in FIG. 5 and then applied to the memory FM in the image coding apparatus of FIG. 17, the image decoding apparatus of FIG. 18 or the image display apparatus of FIG. 19, an image coding method, an image decoding method or an image display method which can perform image coding, image decoding or image display with a memory amount which is economized on as compared with the prior memory unit can be realized.

[Embodiment 5]

The fifth embodiment describes an example where the structure of the memory management apparatus (memory unit) according to the second embodiment is simplified.

Figure 7:
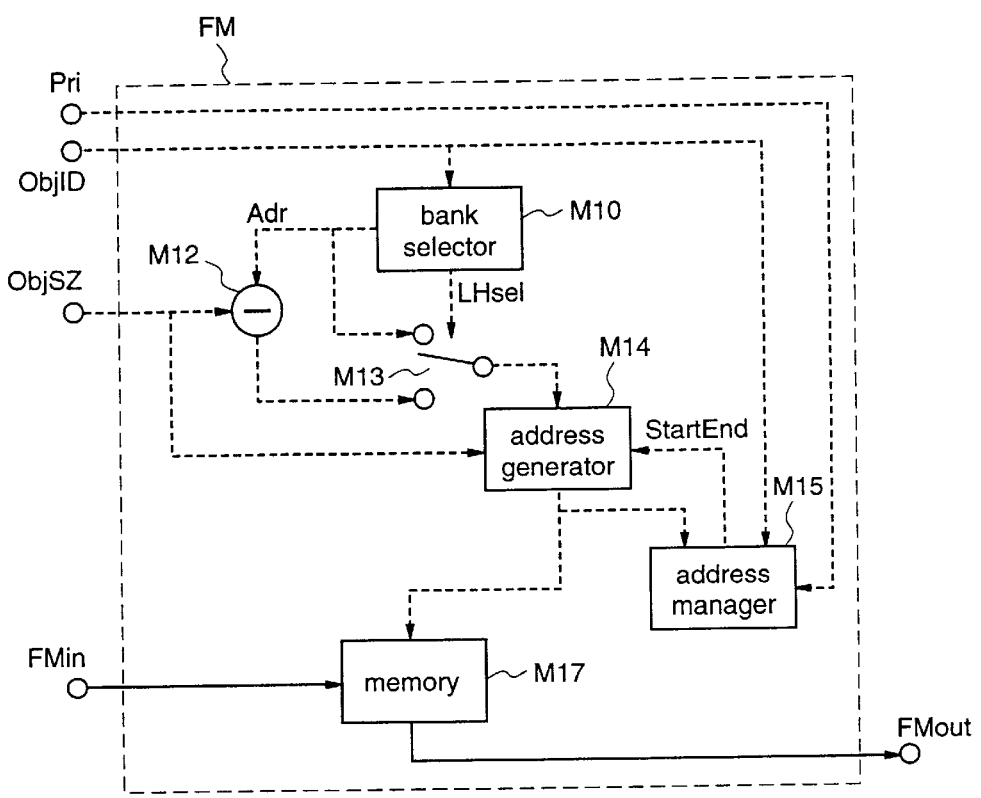
FIG. 7 is a block diagram illustrating a memory unit according to a fifth embodiment of the present invention.

FIG. 7 is a block diagram illustrating a memory unit according to the present invention. The difference between the memory unit of FIG. 7 and the memory unit of FIG. 4 is that NoObj for notifying that the data read from the memory M17 is destroyed and the switch M16 are omitted in this fifth embodiment.

When the memory M17 in the memory unit is sufficiently large and it is assured that the memory area in the memory bank is not destroyed, NoObj is always 0 and therefore it is unnecessary to output NoObj. Accordingly, in such situations, the memory unit in which NoObj is omitted may be used.

According to the above-mentioned structure, the memory management method of the first embodiment is realized by hardware. Thereby, a memory management apparatus having a simpler structure than that of the second embodiment can be obtained, which can greatly reduce the frequency with which data of one of two objects is destroyed by data of the other of the two objects when data of the two objects are to be recorded, increase the efficiency of the memory bank to reduce the power consumed in cases where the memory is incorporated in devices and greatly reduce the risk of erasure of frame data which are required for coding, decoding or display, as well as can monitor whether one of images of two different image sequences is destroyed by the other of the images of the two different image sequences when the images of the two different image sequences are recorded in the same memory address space, and destroy data having a lower priority and protect data having a higher priority when the destruction is caused.

In addition, when the memory FM in the image coding apparatus of FIG. 17, the image decoding apparatus of FIG. 18 or the image display apparatus of FIG. 19 is replaced with the memory management apparatus of FIG. 7, an image coding apparatus, an image decoding apparatus or image display apparatus which can greatly reduce the frequency with which data of one of two objects is destroyed by data of the other of the two objects when data of the two objects are to be recorded in the memory in performing coding, decoding or display of images, increase the efficiency of the memory bank to economize on the memory amount as compared with the prior art memory unit, reduce the power consumed in cases where the memory is incorporated into devices, and greatly reduce the risk of erasure of frame data which are required for coding, decoding or display, as well as can monitor whether an image of one of two different image sequences is destroyed by an image of the other of the two different image sequences when the images of the two different image sequences are recorded in the same memory address space, and destroy data having a lower priority and protect data having a higher priority when the destruction is caused can be constructed.

[Embodiment 6]

The sixth embodiment describes a structure of an image decoding apparatus in which the memory management apparatus (memory unit) according to the fifth embodiment is employed.

Figure 8:
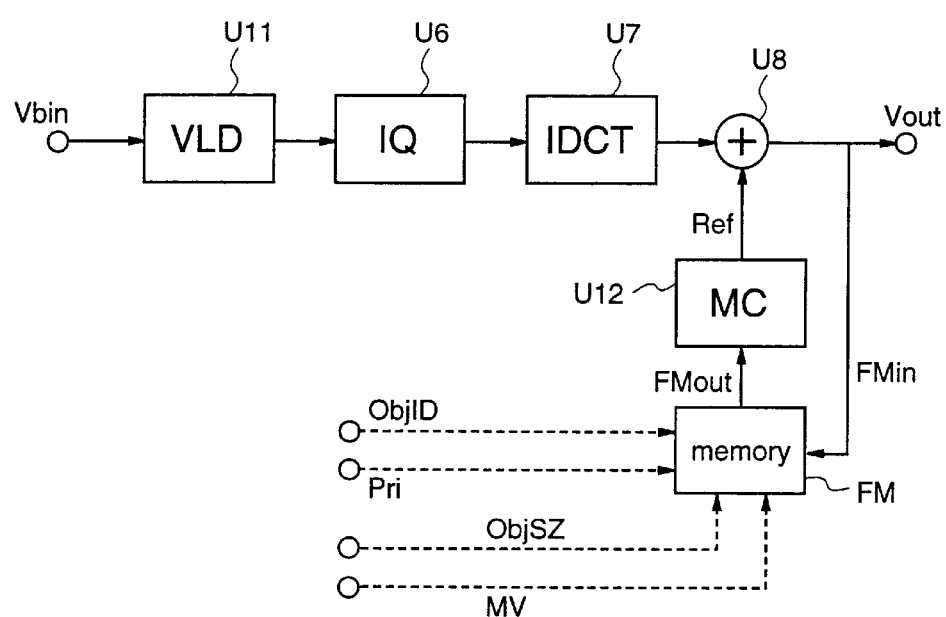
FIG. 8 is a block diagram illustrating an image decoding apparatus according to a sixth embodiment of the present invention.

FIG. 8 is a block diagram illustrating a structure of the image decoding apparatus of the present invention. In this figure, the same reference numbers as those of the image decoding apparatus of FIG. 18 denote the same or corresponding parts, and they are not described here.

A memory unit FM in this figure is the same as the memory unit of FIG. 7. Priority Pri of an image sequence which has been previously set outside is input to the memory unit FM, and referred to when data are to be written on the memory unit FM. To be specific, when frames of different image sequence identification numbers ObjID are to be written in the same address location in the memory, the priority Pri of the frame data to be written is compared with the priority Pri of the frame data which has already been written. When the priority Pri of the frame data to be written is higher than the priority Pri of the frame data which has already been written, the writing onto the memory is executed. On the other hand, when the priority Pri of the frame data to be written is lower than the priority Pri of the frame data which has already been written, the writing onto the memory is interrupted. Accordingly, the destruction of the important image sequence can be avoided, whereby the important image sequence is correctly decoded.

According to this image decoding apparatus, the risk of destruction of image sequences having the lower priority Pri is increased and the image quality may be deteriorated when the destroyed image is decoded. However, the deterioration in image quality in some degree of less important image sequences is tolerable.

According to the above structure, the image decoding apparatus which can greatly reduce the frequency with which data of one of two objects is destroyed by data of the other of the two objects when data of the two objects are to be recorded in a memory in displaying decoded images, increase the efficiency of the memory bank to economize on the memory amount as compared to the prior art memory unit, reduce the power consumed in cases where the memory is incorporated into devices, and greatly reduce the risk of erasure of frame data which are required for decoding, as well as can monitor whether one of images of two different image sequences is destroyed by the other of the images of the two different image sequences when the images of the two different image sequences are to be recorded in the same memory address space, and destroy data having the lower priority and protect data having the higher priority when the destruction is caused can be constructed.

When the image sequence having the lower priority Pri is destroyed, it is possible that the decoding is temporarily interrupted, then the image which has been already decoded is continuously output, and decoding is resumed when the next I frame is input.

In addition, the image decoding apparatus according to the sixth embodiment can use a memory unit other than the memory unit as shown in FIG. 8 as long as it is a memory unit which can utilize the priority Pri.

[Embodiment 7]

The seventh embodiment describes a simplified structure of the memory management apparatus (memory unit) according to the second embodiment.

Figure 9:
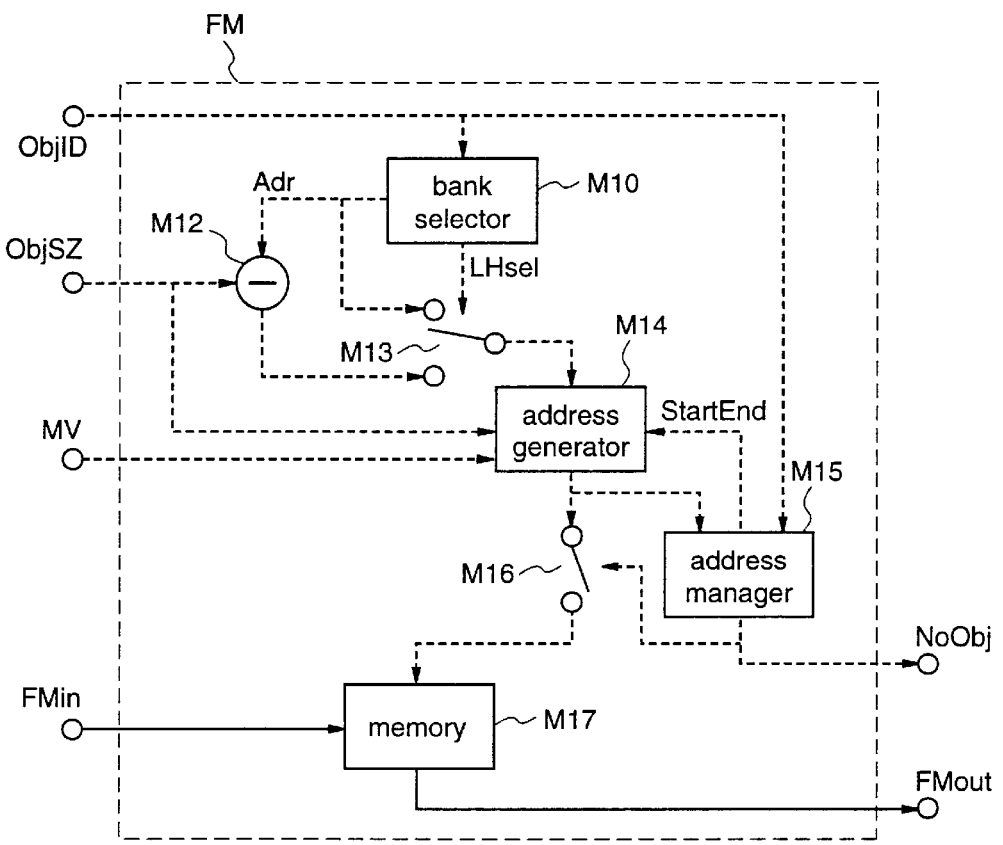
FIG. 9 is a block diagram illustrating a memory unit according to a seventh embodiment.

FIG. 9 is a block diagram illustrating a structure of the memory unit according to the present invention. The difference between the memory units of FIG. 9 and FIG. 4 is that the input of the priority Pri from the outside is omitted.

When the priority is not previously given to the image sequence, the information of the priority cannot be used. In these situations, the memory unit in which the priority Pri is omitted may be used.

Figure 10:
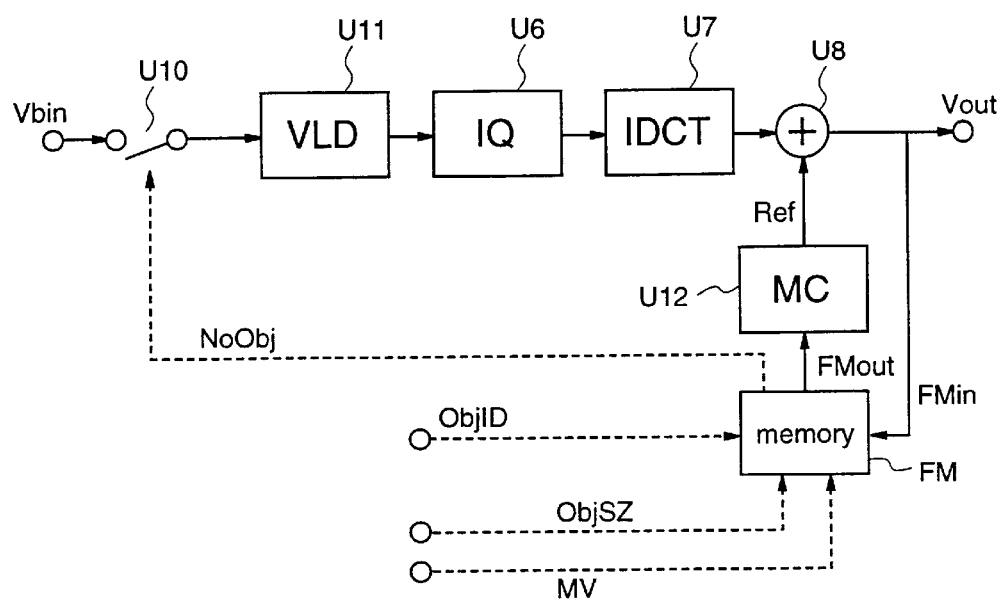
FIG. 10 is a block diagram illustrating an image decoding apparatus according to the seventh embodiment.

FIG. 10 is a block diagram illustrating an image decoding apparatus which uses the memory unit as shown in FIG. 9. In this figure, the same reference numerals as those in the block diagram of FIG. 17 illustrating the image decoding apparatus denote the same or corresponding parts, and they are not described here. The memory unit as shown in FIG. 9 is used as a memory unit FM of FIG. 10. When NoObj output by the memory unit FM notifies that a frame to be referred to is destroyed, the switch U10 is turned OFF to interrupt decoding of that frame. To be specific, when the reference frame is destroyed, it is impossible that necessary decoding is performed correctly on the basis of the reference frame. Therefore, the switch U10 is turned OFF to stop the input of Vbin of that frame. Then, the operations of the VLD unit U11, the inverse quantization unit U6, the IDCT unit U7, the adder U8, and the MC unit U12 are stopped, whereby the calculation amount and the consumed power are reduced.

According to the above structure, the memory management method according to the first embodiment can be realized as hardware. Accordingly, the memory management apparatus having a simpler structure than that of the second embodiment can be obtained, which can greatly reduce the frequency with which data of one of two objects is destroyed by data of the other of the two objects when data of the two objects are to be recorded, increase the efficiency of the memory bank to reduce the power consumed in cases where the memory is incorporated in devices, greatly reduce the risk of erasure of frame data which are required for coding, decoding or display, as well as can monitor whether one of images of two different image sequences is destroyed by the other of the images of the two different image sequences when the images of the two different image sequences are to be recorded in the same memory address space, and notify the outside that destruction is caused in cases of destruction.

In addition, when the memory FM in the image coding apparatus of FIG. 17, the image decoding apparatus of FIG. 18 or the image display apparatus of FIG. 19 is replaced with this memory management apparatus of FIG. 9, an image coding apparatus, an image decoding apparatus or an image display apparatus having a simpler memory management apparatus can be constructed, which can greatly reduce the frequency with which data of one of two objects is destroyed by data of the other of the two objects when data of the two objects are to be recorded in a memory in performing coding, decoding or display of images, increase the efficiency of the memory bank to economize on the memory amount as compared to the prior art memory unit, reduce the power consumed in cases where the memory is incorporated into devices, and greatly reduce the risk of erasure of frame data which are required for coding, decoding or display, as well as can monitor whether one of images of two different image sequences is destroyed by the other of the images of the two different image sequences when the images of the two different image sequences are recorded in the same memory address space, and notify the outside that the destruction is caused in cases of destruction.

The image decoding apparatus of the seventh embodiment can use a memory unit other than the memory unit as shown in FIG. 9 as long as it outputs NoObj.

[Embodiment 8]

The eighth embodiment describes a structure of an image display apparatus in which the memory management apparatus (memory unit) according to the seventh embodiment is employed.

Figure 11:
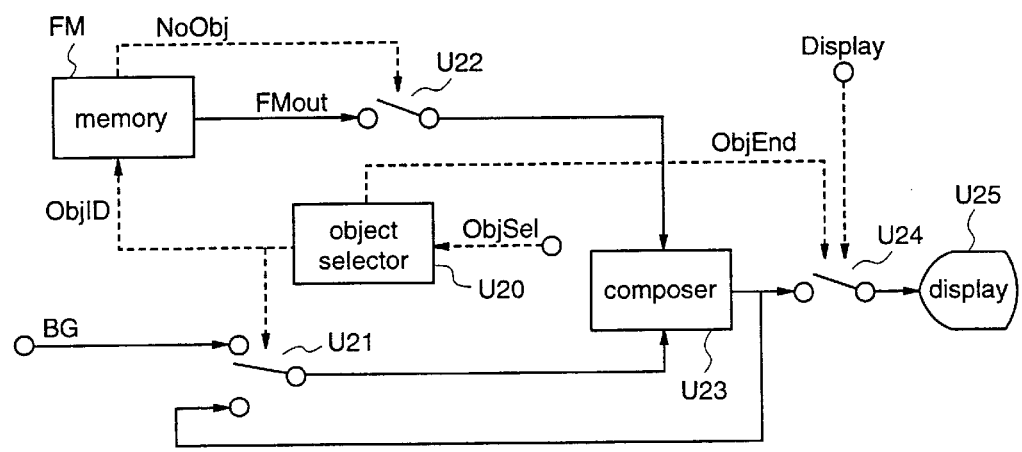
FIG. 11 is a block diagram illustrating an image display apparatus according to an eighth embodiment.

FIG. 11 is a block diagram illustrating the image display apparatus according to the present invention. In this figure, the same reference numerals as those in the block diagram of FIG. 19 illustrating the image display apparatus denote the same or corresponding parts.

FM denotes a memory unit as a memory means which can notify whether image data in the memory, required for display of image sequences, are destroyed or not. U20 denotes an object selector as an object selection means which gives an instruction to display an image as it is when the image data of the image sequence is not destroyed and gives an instruction to display an image data which is not destroyed at the latest time in the image sequence in place of a destroyed image data when the image data of the image sequence is destroyed. U25 denotes a display device as a display means for displaying the image data which is selected by the object selection means.

The memory unit as shown in FIG. 9 is used as the memory unit of FIG. 11. The switch U22 is switched according to the value of NoObj output by the memory unit FM. When the memory area is not destroyed and the switch U22 is turned ON in accordance with the value of NoObj, the image display apparatus operates in the same manner as the prior art as shown in FIG. 19. To be specific, the object selector U20 successively instructs the identification number of an image sequence to be display to the memory unit FM as ObjID in accordance with the information ObjSe1 of the image sequence to be displayed designated by the user. An image output FMout which is output by the memory unit FM in accordance with this instruction is input to the composer U23. Then, the image output FMout is composed with an image of another image sequence output by the memory unit FM and displayed, or the image output FMout is composed with an already determined background frame BG which is selected by the switch U21, output to the switch U24, and displayed. When all image sequences to be displayed are read out from the memory unit FM, the object selector U20 notifies the switch U24 using an end signal ObjEnd that reading of the image sequences to be displayed is ended. Accordingly, the switch U24 outputs the composed image to the display device U25 in a timing of a display synchronous signal Display.

In the case where NoObj notifies that the frame cannot be output as FMout, i.e., the memory area is destroyed and the frame in the same image sequence cannot be displayed, when the images are composed by the composer U23, a false frame is obtained. Therefore, the switch U22 is turned OFF using the value of NoObj.

On the other hand, when NoObj notifies that any frame is output as FMout, i.e., when the frame is not destroyed or another frame in the same image sequence (which is not destroyed) is read out, the switch U22 is turned ON as described above to compose images. Therefore, a correct composed image can be obtained when the frame is not destroyed, and a composed image having less unnaturalness can be obtained when another frame in the same image sequence is read.

In this case, when the address manager has a function of holding an address of frame data at the latest time which has the same image sequence identification number and is not destroyed, image data which is not destroyed in this image sequence at the latest time can be displayed. Accordingly, a composed image having further less unnaturalness can be obtained.

According to the above structure, an image display apparatus having a simpler memory management apparatus can be constructed, which can greatly reduce the frequency with which data of one of two objects is destroyed by data of the other of the two objects when data of the two objects are to be recorded in a memory in displaying images, increase the efficiency of the memory bank to economize on the memory amount as compared to the prior art memory unit, reduce the power consumed in cases where the memory is incorporated in devices, and greatly reduce the risk of erasure of frame data which are required for display, as well as can monitor whether one of images of two different image sequences is destroyed by the other of images of the two different image sequences when the images of the two different image sequences are recorded in the same memory address space, and notify the outside that the destruction is caused in cases of destruction.

The image display apparatus of the eighth embodiment can use a memory unit other than the memory unit as shown in FIG. 11 as long as the memory unit outputs NoObj.

[Embodiment 9]

The ninth embodiment describes a further simplified structure of the memory management apparatus (memory unit) according to the second embodiment.

Figure 12:
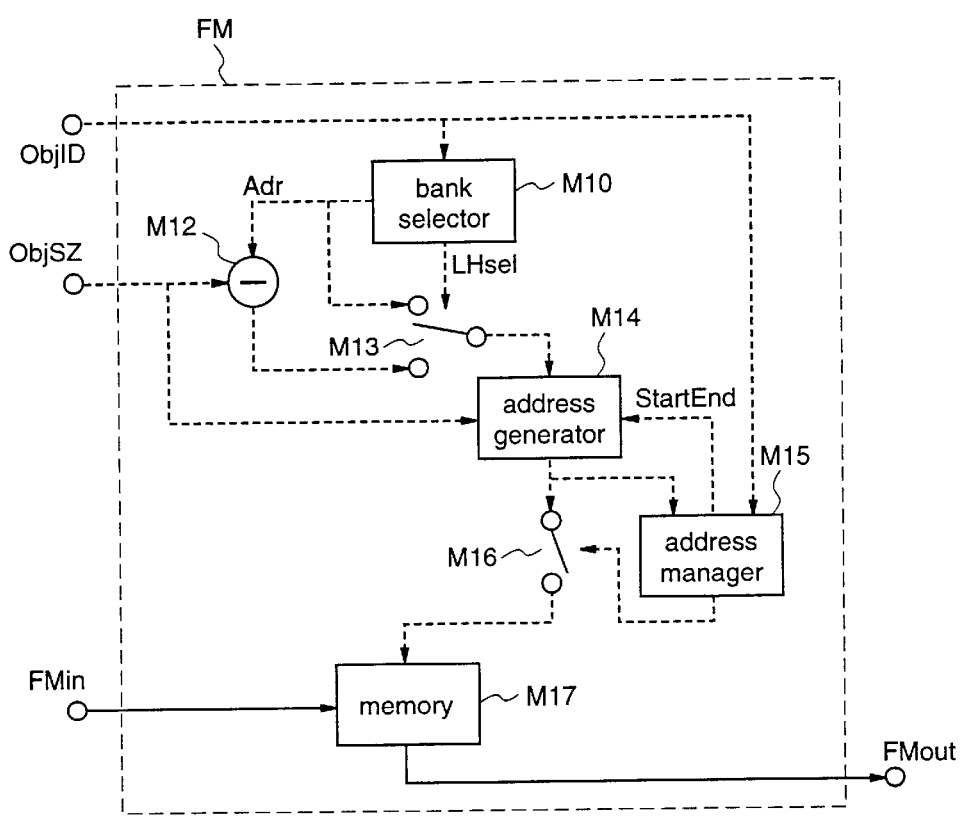
FIG. 12 is a block diagram illustrating a memory unit according to a ninth embodiment.

FIG. 12 is a block diagram illustrating a memory unit according to the present invention. The difference between the memory units of FIG. 12 and FIG. 4 is that the input of the priority Pri from the outside is omitted and NoObj notifying that data to be read from the memory M17 are destroyed and the switch M16 are omitted in this ninth embodiment.

According to the above structure, the memory management method of the first embodiment can be realized as hardware. Accordingly, a memory management apparatus having a structure which is much simpler than that of the fifth or seventh embodiment which can greatly reduce the frequency with which data of one of two objects is destroyed by data of the other of the two objects when data of the two objects are to be recorded, increase the efficiency of the memory bank to reduce the power consumed in cases where the memory is incorporated into devices and greatly reduce the risk of erasure of frame data which are required for coding, decoding or display can be obtained.

In addition, when the memory FM of the image coding apparatus of FIG. 17, the image decoding apparatus of FIG. 18 or the image display apparatus of FIG. 19 is replaced with the memory management apparatus of FIG. 12 as it is, an image coding apparatus, an image decoding apparatus or an image display apparatus having a memory management apparatus with a much simpler structure, which can greatly reduce the frequency with which a data of one of two objects is destroyed by a data of the other of the two objects when data of the two objects are to be recorded in a memory in performing coding, decoding or display of images, increase the efficiency of the memory bank to economize on the memory amount as compared with the prior art memory unit, reduce the power consumed in cases where the memory is incorporated in devices, and greatly reduce the risk of erasure of frame data which are required for coding, decoding or display can be constructed.

[Embodiment 10]

The tenth embodiment describes an image decoding apparatus having the structures according to the sixth and seventh embodiments together.

Figure 13:
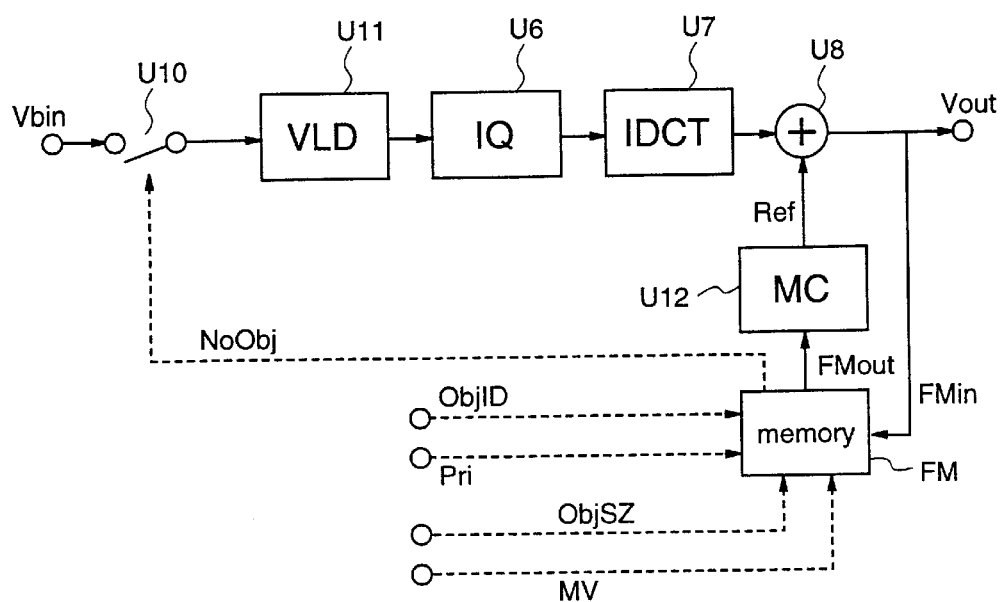
FIG. 13 is a block diagram illustrating an image decoding apparatus according to a tenth embodiment.

FIG. 13 is a block diagram illustrating the image decoding apparatus according to the tenth embodiment. In this figure, the same reference numerals as those in the block diagram illustrating the image decoding apparatus of FIG. 10 denote the same or corresponding parts, and they are not described here.

The memory unit as shown in FIG. 4 is employed as the memory unit FM of FIG. 13. Therefore, since the image decoding apparatus of the tenth embodiment has both of the priority Pri and NoObj, this image decoding apparatus has respective advantages of the image decoding apparatus as shown in FIGS. 8 and 10 together.

The image decoding apparatus of the tenth embodiment can use a memory unit other than the memory unit as shown in FIG. 13, as long as the memory unit can handle the priority Pri and NoObj.

[Embodiment 11]

Hereinafter, a data management apparatus according to the eleventh embodiment of the present invention will be described with reference to FIGS. 21(a) to 25. In the above-mentioned embodiments 1 to 10, the decoding image storage memory and the reference image storage memory are described separately as shown in FIG. 2, like FM1a and FM1b. However, the method of utilizing the decoding image storage memory and the method of utilizing the reference image storage memory are identical. Therefore, in the following description, the decoding image storage memory and the reference image storage memory are not described separately and the description is given of only a method for managing an image storage memory.

In MPEG1 or MPEG2, the size of an image data (hereinafter referred to as an object) does not vary in the middle of an image sequence. On the other hand, in MPEG4, the size of an object may vary in the middle of an image sequence.

Accordingly, in this eleventh embodiment, the method for managing the image storage memory is changed in the case where data stored in the image storage memory are all object data whose size does not vary (hereinafter referred to as a simple profile) and in the case where data stored in the image storage memory include at least one object data whose size varies (hereinafter referred to as a core profile), thereby managing the memory.

FIGS. 21(a)–21(d) are diagrams showing an example of the memory management method in cases of simple profile (hereinafter referred to as a simple profile mode). FIGS. 22(a)–22(d) are diagrams showing an example of the memory management method in cases of core profile (hereinafter referred to as a core profile mode).

In this eleventh embodiment, the description is given of the case where the number of image sequences constituting an image is four at the maximum.

As shown in FIGS. 21(a)–21(d) and 22(a)–(d), when the number of image sequences constituting an image is four at the maximum, the memory address spaces are reserved in the order of the memory lowest location, the memory highest location and the memory central location (in FIGS. 21(a)–21(d) and 22(a)–22(d), the upper end corresponds to the lowest location of the memory address) according to the number of image sequences. Then, the object data of each image sequence is stored in the reserved memory space.

To be specific, as shown in FIGS. 21(a)–21(d), in the simple profile mode, when the number of objects is one, the memory space is reserved in the lowest location in the memory (FIG. 21(a)). When the number of objects is two, the memory spaces are reserved in the lowest location and highest location in the memory, respectively (FIG. 21(b)). When the number of objects is three, the memory spaces are reserved in the lowest location, the highest location, and a location which is adjacent to the object data which is stored in the memory lowest location as one end location in the memory, respectively (FIG. 21(c)). When the number of objects is four, another memory space is further reserved in a location which is adjacent to the object data which is stored in the memory highest location as the other end location (FIG. 21(d)).

When the memory management is performed as described above, the efficiency of the memory area can be increased in cases where only objects whose sizes do not vary are handled, thereby greatly reducing the risk of incapability of decoding due to exhaustion of the memory required for the decoding.

In the core profile mode, as shown in FIGS. 22(a)–22(d), when the number of objects is one, the memory space is reserved in the lowest location in the memory (FIG. 22(a)). When the number of objects is two, the memory spaces are reserved in the lowest location and highest location in the memory, respectively (FIG. 22(b)). When the number of objects is three, the memory spaces are reserved in the lowest location, highest location, and a location extending from the memory central location which divides the image memory into two, toward the memory lower location, respectively (FIG. 22(c)). When the number of objects is four, the memory spaces are further reserved from the memory central location which divides the image memory into two, toward memory lower location and memory higher location, respectively, so that one end of one of two object data adjoins one end of the other of the two object data at the memory central location (FIG. 22(d)).

When the memory is managed as described above, in the case where the image including objects whose sizes vary is handled, even when the size of each object varies in some degree, the memory areas can be reserved dynamically. Therefore, the risk of incapability of decoding due to exhaustion of the memory required for the decoding can be greatly reduced.

In considering that the processes are usually complicated when the size of the object varies, the total of the memory capacity which is required for decoding of each object in the core profile is often set to be smaller than the total of the memory capacity which is required in the simple profile. Therefore, in cases of core profile, even when the memory spaces are not reserved without gaps as shown in FIGS. 21(a)–21(d), it is practically sufficient if the total of the memory capacities of two objects is fixed as shown in FIGS. 22(a)–(d).

These are ideal examples of locations in the memory in the simple profile mode and the core profile mode. The memory spaces are reserved so as to obtain these locations as much as possible. At a time when an object is erased, there are some cases where the location is different from the ideal location. However, when a memory for a new object is to be reserved, the memory for the new object is reserved in such a location that the memory location becomes close to the location as shown in FIGS. 21(a)–21(d) or 22(a)–22(d) is obtained.

In FIGS. 21(a)–21(d) and 22(a)–22(d), Obj1, Obj2, Obj3 and Obj4 do not denote the respective object IDs but merely denote the memory locations, respectively. To be specific, the object IDs do not correspond to the numbers of the memory locations, i.e., Obj1, Obj2, Obj3 and Obj4 fixedly.

In FIGS. 22(a)–22(d), arrows show the directions of dynamic memory expansion. Conceptually, this is the same as the memory management method as described in the first embodiment. Therefore, this is not described here.

Next, the process of switching the memory management method according to the eleventh embodiment from the simple profile mode to the core profile mode is described with reference to FIG. 23.

Figure 23:
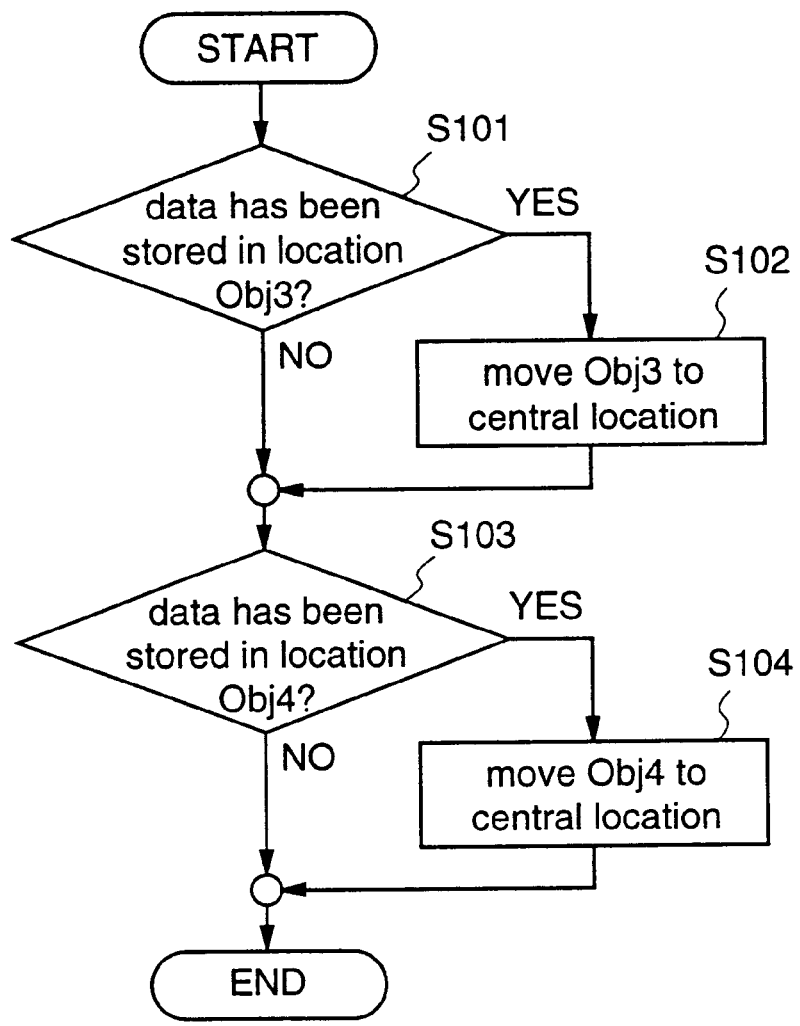
FIG. 23 is a flowchart for explaining a process of switching the memory management method of the eleventh embodiment from the simple profile mode to the core profile mode.

FIG. 23 is a flowchart for explaining the process of switching the memory management method according to the eleventh embodiment from the simple profile mode to the core profile mode.

The memory management method according to the eleventh embodiment is initially operated in the simple profile mode. When image sequences to be processes include an image sequence having an object whose size varies, the switching process from the simple profile mode to the core profile mode is performed at a time when an arbitrary-shaped object of the image sequence whose size varies is newly detected. When the image sequences to be processed include no image sequence having the object whose size varies, the switching from the simple profile mode to the core profile mode is not performed and therefore the memory areas are reserved according to the simple profile mode.

In FIG. 23, when the arbitrary-shaped object whose size varies is newly input, it is initially judged whether data has already been stored in the location Obj3 as shown in FIGS. 21(a)–21(d) (S101). When data has been stored in the location Obj3, the data is moved to the memory central location (see FIGS. 22(c) and 22(d)) (S102).

Then, it is judged whether data has been already stored in the location Obj4 as shown in FIGS. 21(a)–21(d) (S103). When data has been stored in the location Obj4, the data is moved to the memory central location (see FIGS. 22(c) and 22(d)) (S104).

Thereby, since the arrangement of the memory address spaces becomes the arrangement in the core profile mode (see FIGS. 22(a)–22(d)), the memory spaces can be reserved for the following object data according to the core profile mode.

Generally, it is difficult to previously know that a stream is a simple profile or core profile. Further, the sum of memory capacities which are required for decoding of respective objects is larger in the simple profile than in core profile. Therefore, until an arbitrary-shaped object is input, the apparatus operates in the simple profile mode which requires a larger memory capacity, thereby to reserve a larger memory capacity required for the simple profile. When the arbitrary-shaped object is input and then the method of utilizing the memory is changed from the simple profile mode to the core profile mode, the sum of the memory amounts between two objects can be freely changed within the upper limit. Thereby, the memory area which is sufficient to the decoding can be used with hardly performing the relocation of memory locations.

While the relocation of the memory is performed, the decoding process is interrupted. Therefore, when the decoding capacity is not sufficient, the decoding process for data which are input during this interruption is interrupted. Accordingly, in this case, the decoding is interrupted until the next I frame data is input and the reservation of the memory address spaces may be resumed in the core profile mode at the time when the next I frame is received.

After the memory management method is switched into the core profile mode, the method is not switched into the simple profile mode during the processing. This is because when the image sequences to be processed include an image sequence having an object whose size varies, the possibility of an arbitrary-shaped object being input thereafter is high and the core profile does not require the memory amount as large as the simple profile. Further, when the process is switched between the simple profile mode and the core profile mode, the risk of interruption of the decoding process is high. Accordingly, the disadvantage of the temporary interruption of decoding is larger than the advantage of the temporary increase in the available memory amount by the mode switching. When the decoding capability and the data relocation capability are sufficiently large, the processing can be switched from the core profile mode into the simple profile mode.

Next, the simple profile mode as one of the memory storage methods according to the eleventh embodiment is described with reference to FIGS. 21(a)–21(d) and 24 to 28.

The reservation of the memory spaces according to the simple profile mode of the eleventh embodiment increases the efficiency of the memory in cases of simple profile, as well as reduces the number of times that the process of relocating the memory accompanied by interruption of the decoding process is performed. The details are described with reference to FIG. 24.

Figure 24:
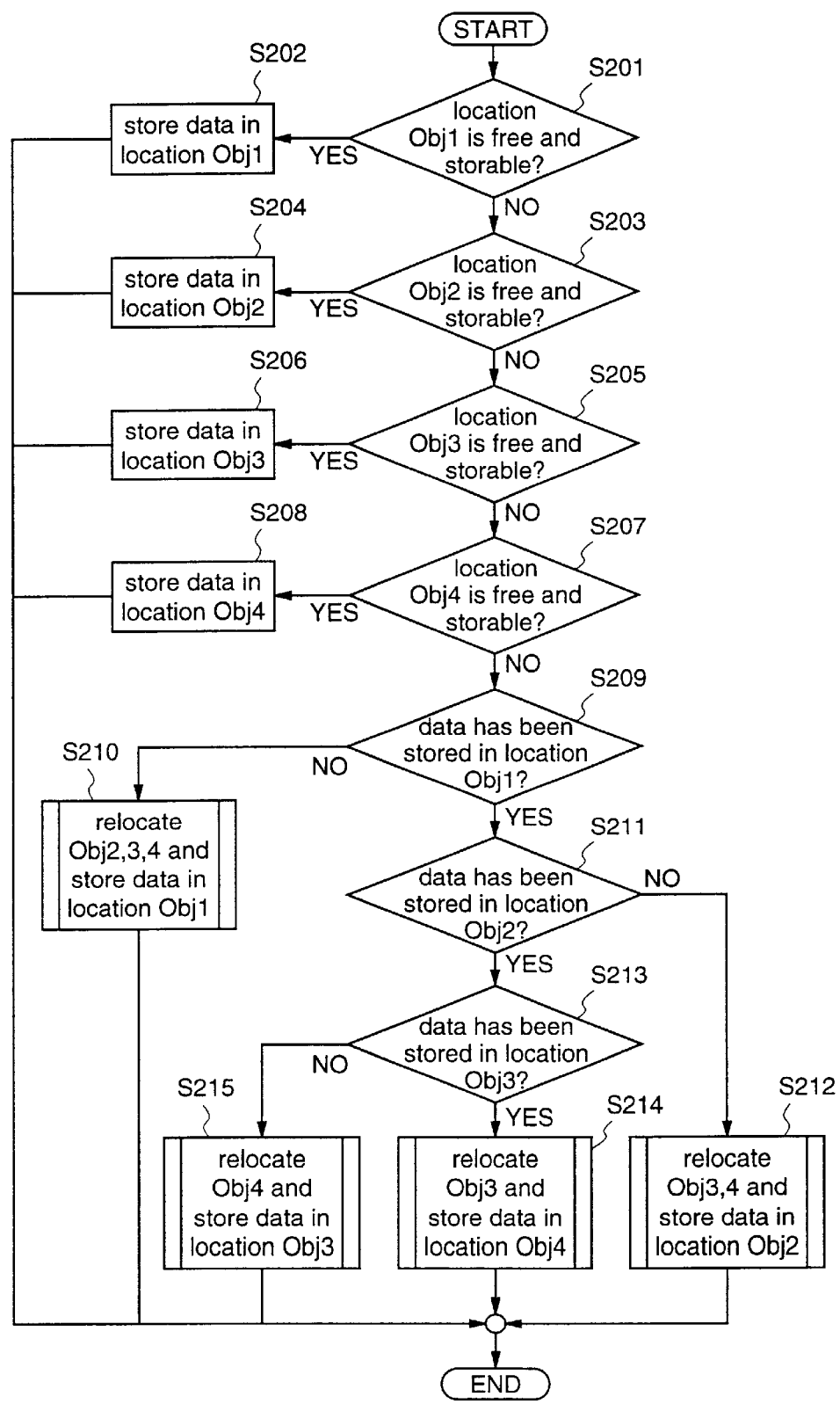
FIG. 24 is a flowchart for explaining an example of a procedure of reserving memory address spaces in the simple profile mode according to the eleventh embodiment.

FIG. 24 is a flowchart for explaining an example of the procedure of reserving the memory address spaces in the simple profile mode. This memory address space reservation procedure is started when a rectangular-shaped object data whose size does not vary is newly input.

When the rectangular-shaped object data is newly input, it is initially judged whether the location Obj1 is a free space and the input data can be stored in the location Obj1 (S201). Then, when the location Obj1 is a free space and the input data can be stored in the location Obj1, the newly input data is stored in the location Obj1 (S202).

When the location Obj1 is not a free space or the input data cannot be stored in the location Obj1, it is judged whether the location Obj2 is a free space and the input data can be stored in the location Obj2 (S203). When the location Obj2 is a free space and the input data can be stored in the location Obj2, the newly input data is stored in the location Obj2 (S204).

When the location Obj2 is not a free space or the input data cannot be stored in the location Obj2, it is judged whether the location Obj3 is a free space and the input data can be stored in the location Obj3 (S205). When the location Obj3 is a free space and the input data can be stored in the location Obj3, the newly input data is stored in the location Obj3 (S206).

When the location Obj3 is not a free space or the input data cannot be stored in the location Obj3, it is judged whether the location Obj4 is a free space and the input data can be stored in the location Obj4 (step S207). When the location Obj4 is a free space and the input data can be stored in the location Obj4, the newly input data is stored in the location Obj4 (S208).

When the location Obj4 is not a free space or the input data cannot be stored in the location Obj4, the newly input object data cannot be stored in any of the locations Obj1, Obj2, Obj3 and Obj4 in the present data arrangement in the memory. Accordingly, the memory address spaces are relocated and the process of reserving the memory address space for storing the newly input object data is performed.

The memory area is previously reserved so that object data of all image sequences can be stored in the memory. Accordingly, when the newly input data cannot be stored in any of the locations Obj1, Obj2, Obj3 and Obj4, it means that there are free spaces anywhere between the respective locations Obj1, Obj2, Obj3 and Obj4. Therefore, the relocation of the memory address spaces is performed so as to pad the free spaces.

To be specific, it is initially examined whether data has already been stored in the location Obj1 (S209). When no data has been stored in the location Obj1, data in the locations Obj2, Obj3 and Obj4 are relocated as shown in FIGS. 21(a)–21(d) and then the newly input data is stored in the location Obj1 (S210). The details of the relocation of the data in the locations Obj2, Obj3 and Obj4 in step S210 are described later with reference to FIG. 25.

When data has already been stored in the location Obj1, it is examined whether data has already been stored in the location Obj2 (S211). When no data has been stored in the location Obj2, data in the locations Obj3 and Obj4 are relocated as shown in FIGS. 21(a)–21(d) and then the newly input data is stored in the location Obj2 (S212). The details of the relocation of the data in the locations Obj3 and Obj4 in step S212 are described later with reference to FIG. 26.

When data has been stored in the location Obj2, it is examined whether data has been already stored in the location Obj3 (S213). When data has already been stored in the location Obj3, the data in the location Obj3 is relocated as shown in FIGS. 21(a)–21(d) and then the newly input data is stored in the location Obj4 (S214). The details of the relocation of the data in the location Obj3 in step S214 are described later with reference to FIG. 27.

When no data has been stored in the location Obj3, data in the location Obj4 is relocated as shown in FIGS. 21(a)–21(d) and then the newly input data is stored in the location Obj3 (S215). The details of the relocation of the data in the location Obj4 in step S215 are described later with reference to FIG. 28.

As described above, it is initially judged whether the memory for new object data can be reserved or not and the relocation of the memory space locations of the existing objects is performed only when the memory for the new object data cannot be reserved. Thereby, the data relocation process having a high risk of the interruption of the decoding process can be reduced. Therefore, the efficiency of the memory can be increased as well as the risk of the incapability of the decoding due to exhaustion of the memory required for the decoding can be greatly reduced, whereby the memory management method of high practical value can be realized.

Then, the process of relocating the data in the locations Obj2, Obj3 and Obj4 according to the simple profile mode in step S210 is described with reference to FIG. 25.

Figure 25:
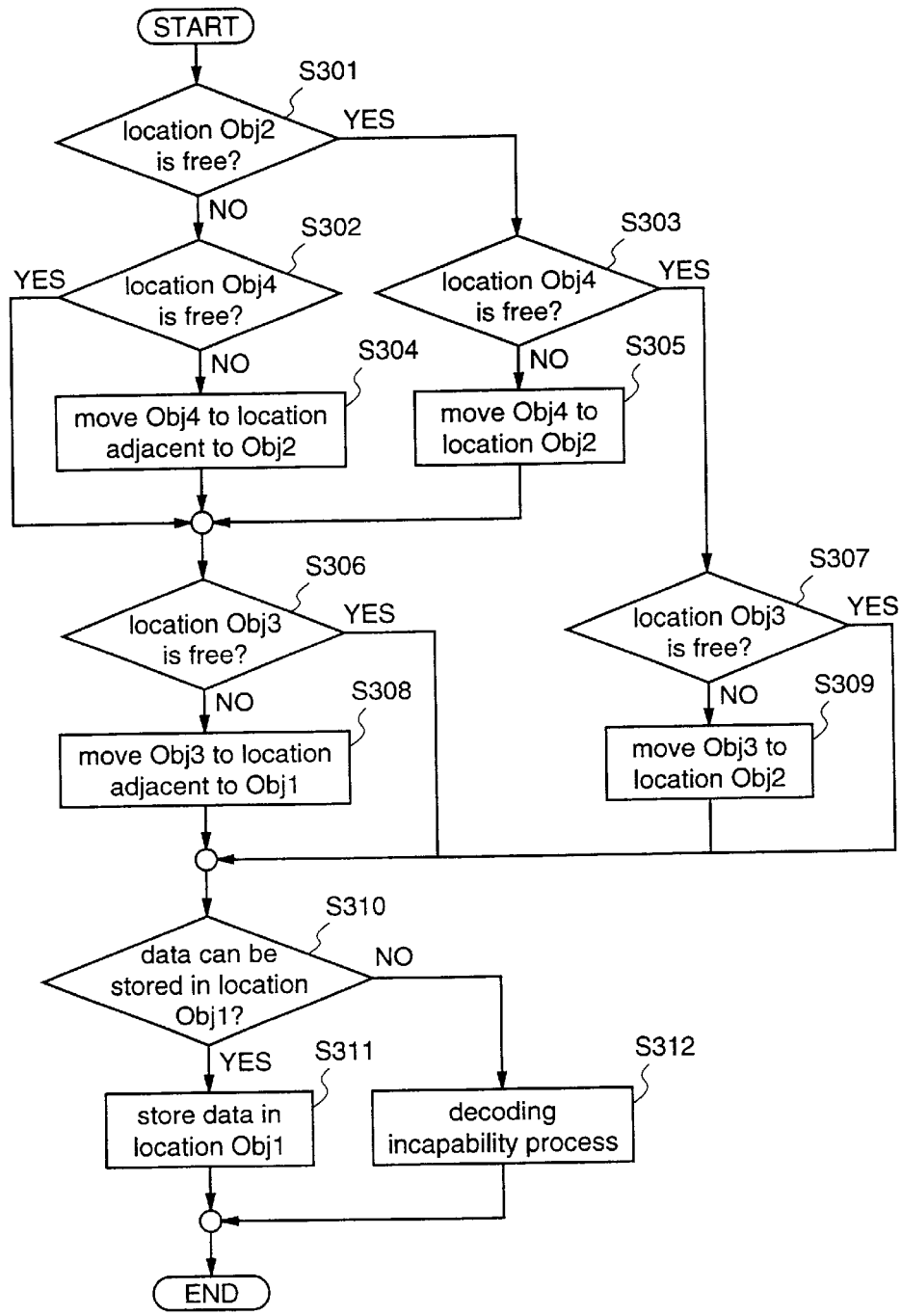
FIG. 25 is a flowchart for explaining relocation of data in locations of Obj2, Obj3 and Obj4 in the simple profile mode according to the eleventh embodiment.

FIG. 25 is a flowchart for explaining the relocation of the data in the locations Obj2, Obj3 and Obj4 in the simple profile mode.

Figure 21:
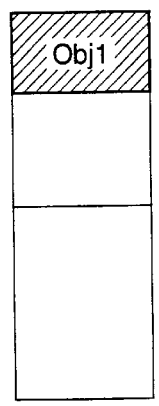
FIGS. 21(a)–21(d) are diagrams showing an example of a memory management method in cases of simple profile according to an eleventh embodiment of the present invention.
Figure 21:
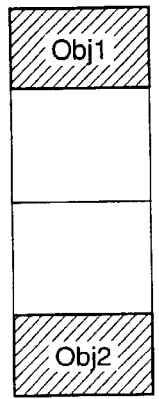
Figure 21:
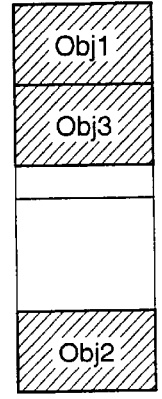
Figure 21:
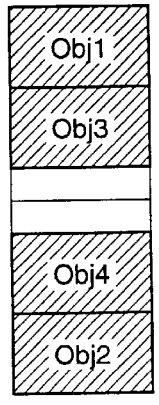
Figure 22:
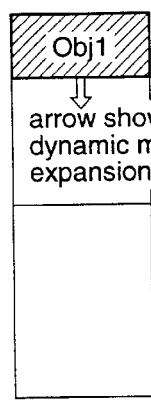
FIGS. 22(a)–22(d) are diagrams showing an example of a memory management method in cases of core profile according to the eleventh embodiment.
Figure 22:
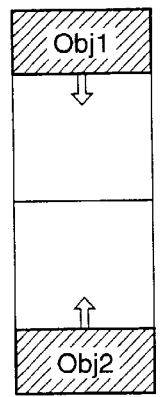
Figure 22:
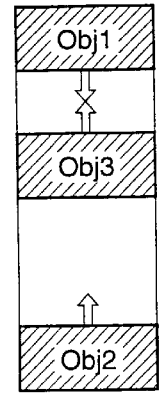
Figure 22:
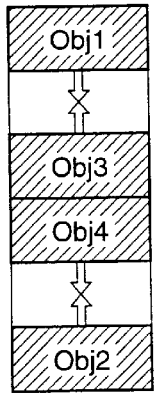

Initially, it is examined whether the location Obj2 is a free space (S301). Then, it is examined whether the location Obj4 is a free space (S302 and S303). When neither the locations Obj2 nor Obj4 is a free space, i.e., when data are stored in both of the locations Obj2 and Obj4, the data which has been stored in the location Obj4 is moved to a location which is adjacent to data which has been stored in the location Obj2 as shown in FIG. 21 (S304).

When the location Obj2 is a free space and the location Obj4 is not a free space, the data which has been stored in the location Obj4 is moved to the location Obj2 (S305).

Then, it is examined whether the location Obj3 is a free space (S306 and S307). When the location Obj3 is not a free space, i.e., data is stored in the location Obj3, and when data is stored in one of the locations Obj2 and Obj4, the data stored in the location Obj3 is moved to a location which is adjacent to new data to be stored in the location Obj1 as shown in FIG. 21 (S308).

On the other hand, when data has been stored in the location Obj3, and when no data has been stored in either the location Obj2 or Obj4, the data which has been stored in the location Obj3 is moved to the location Obj2 (S309).

In a case where data more than the memory amount which can be processed by the decoder are input, when the data stored in the location Obj3 is moved to the location which is adjacent to the new data to be stored in the location Obj1 in step S308, this data and the data stored in the location Obj2 or Obj4 are overlapping with each other. In this case, the data stored in the location Obj3 is not moved.

Then, it is examined whether the newly input data can be stored in the location Obj1 (S310). When the newly input data can be stored in the location Obj1, the newly input data stored in the location Obj1 (S311).

On the other hand, when the newly input data cannot be stored in the location Obj1, it is judged that data more than the memory amount which can be processed by the decoder are input, and then the decoding incapability process is performed (S312).

In this decoding incapability process, the decoding process for the object of the newly input data is interrupted until the next I frame data is input, and the reservation of the memory address spaces is started again at the time when the next I frame is received.

Then, the process of relocating the data of the locations Obj3 and Obj4 in the simple profile mode in step S212 is described with reference to FIG. 26.

Figure 26:
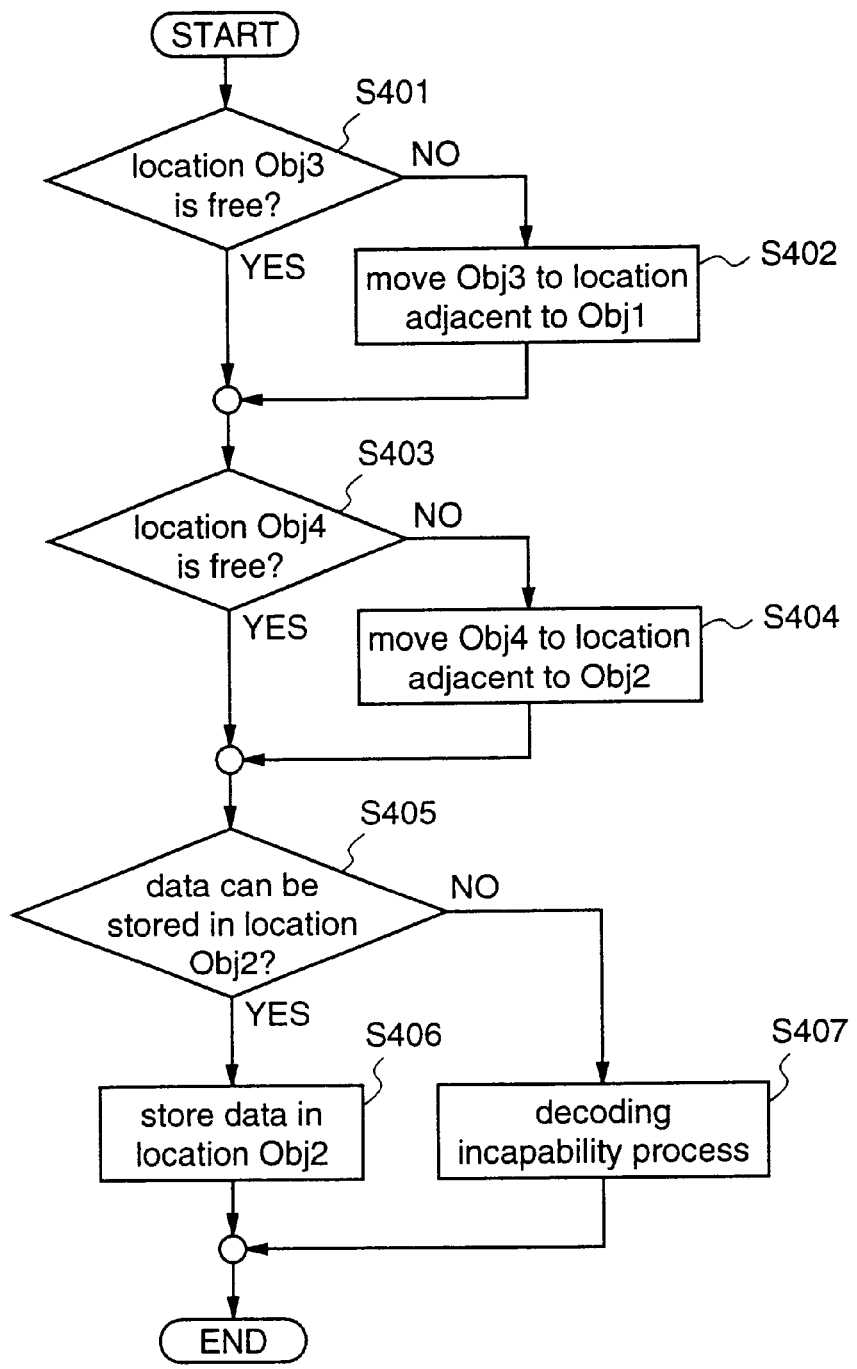
FIG. 26 is a flowchart for explaining relocation of the data in the locations of Obj3 and Obj4 in the simple profile mode according to the eleventh embodiment.

FIG. 26 is a flowchart for explaining the relocation of the data in the locations Obj3 and Obj4 in the simple profile mode.

Initially, it is examined whether the location Obj3 is a free space (S401). When the location Obj3 is not a free space, i.e., when data is stored in the location Obj3, the data which has been stored in the location Obj3 is moved to a location which is adjacent to a new data to be stored in the location Obj1 as shown in FIG. 21 (S402).

Next, it is examined whether the location Obj4 is a free space (S403). When the location Obj4 is not a free space, i.e., data is stored in the location Obj4, the data which has been stored in the location Obj4 is moved to a location which is adjacent to a new data to be stored in the location Obj2 as shown in FIG. 21 (S404).

In the case where data more than the memory amount which can be processed by the decoder are input, when the data stored in the location Obj4 is moved to the location which is adjacent to a new data to be stored in the location Obj2 in step S404, this data and the data stored in the location Obj1 or Obj3 overlap with each other. Therefore, in this case, the data stored in the location Obj4 is not moved.

Then, it is examined whether the newly input data can be stored in the location Obj2 (S405). When the newly input data can be stored in the location Obj2, the newly input data is stored in the location Obj2 (S406).

On the other hand, when the newly input data cannot be stored in the location Obj2, it is judged that data more than the memory amount which can be processed by the decoder are input, and the decoding incapability process is performed (S407).

In this decoding incapability process, the decoding processing for the object of the newly input data is interrupted until the next I frame data is input and the reservation of the memory address spaces is started again when the next I frame is received.

Then, the process of relocating the data in the location Obj3 in the simple profile mode in step S214 is described with reference to FIG. 27.

Figure 27:
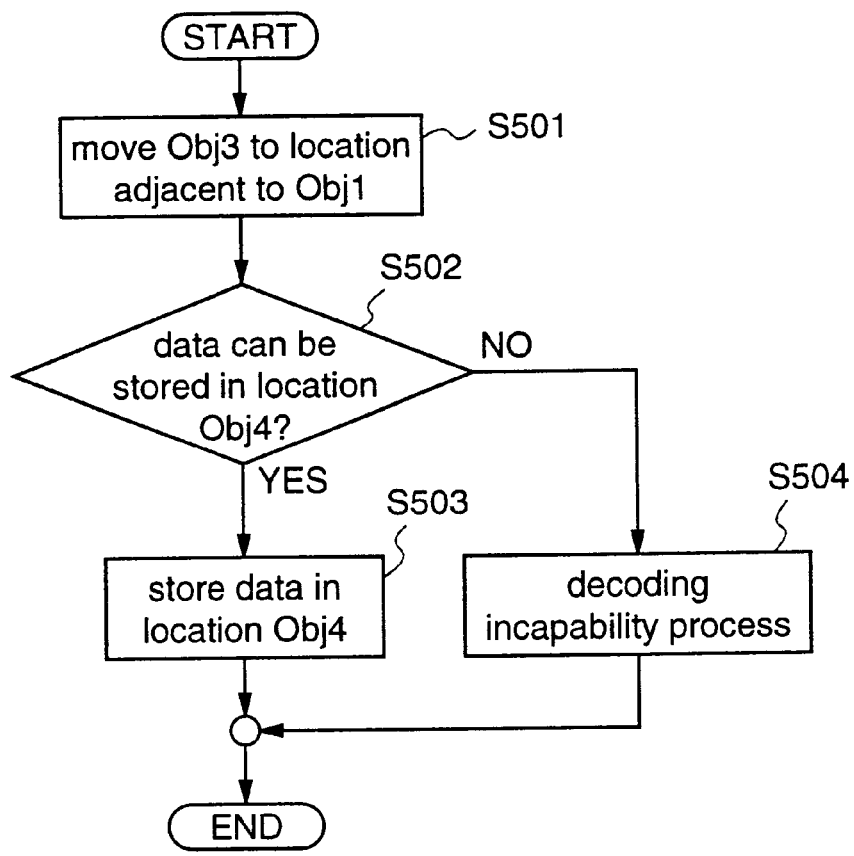
FIG. 27 is a flowchart for explaining relocation of the data in the location of Obj3 in the simple profile mode according to the eleventh embodiment.

FIG. 27 is a flowchart for explaining the relocation of the data in the location Obj3 in the simple profile mode. This processing is performed in the case where data are stored in all of the locations Obj1, Obj2 and Obj3 and newly input data cannot be stored in the free space in the location Obj4.

Initially, the data stored in the location Obj3 is moved to a location which is adjacent to the data stored in the location Obj1 as shown in FIGS. 21(a)–21(d) (S501).

Then, it is examined whether the newly input data can be stored in the location Obj4 (S502). When the newly input data can be stored in the location Obj4, the newly input data is stored in the location Obj4 (S503).

On the other hand, when the newly input data cannot be stored in the location Obj4, it is judged that data more than the memory amount which can be processed by the decoder are input, and the decoding incapability process is performed (S504).

In this decoding incapability process, the decoding process for the object of the newly input data is interrupted until the next I frame data is input and the reservation of the memory address spaces is started again at a time when the next I frame is received.

Then, the process of relocating the data in the location Obj4 in the simple profile mode in step S215 is described with reference to FIG. 28.

Figure 28:
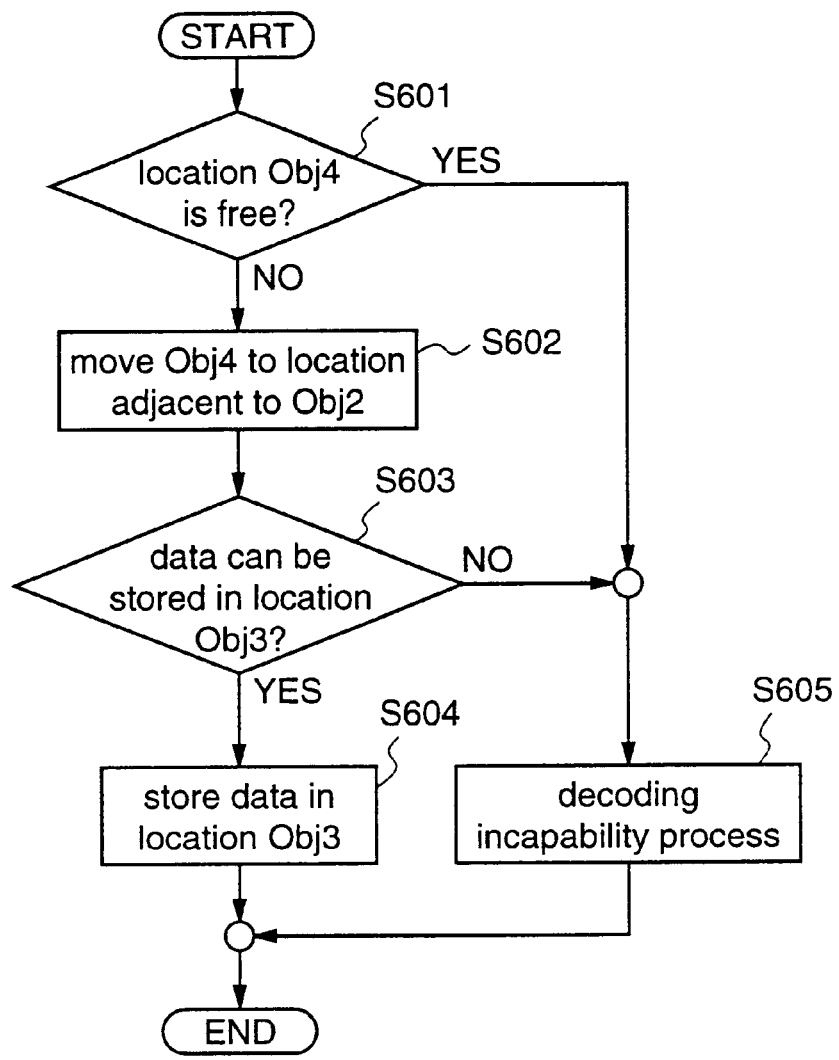
FIG. 28 is a flowchart for explaining relocation of the data in the location of Obj4 in the simple profile mode according to the eleventh embodiment.

FIG. 28 is a flowchart for explaining the relocation of the data in the location Obj4 in the simple profile mode. This processing is performed when data are stored in the locations Obj1 and Obj2 and newly input data cannot be stored in the locations Obj3 nor Obj4.

Initially, it is examined whether the location Obj4 is a free space (S601). When the location Obj4 is a free space, i.e., no data has been stored in the location Obj4, it is judged that data more than the memory amount which can be processed by the decoder are input, and the process proceeds to step S605.

On the other hand, when the location Obj4 is not a free space, i.e., data is stored in the location Obj4, the data stored in the location Obj4 is moved to a location which is adjacent to the data stored in the location Obj2 as shown in FIGS. 21(a)–21(d) (S602).

Then, it is examined whether newly input data can be stored in the location Obj3 (S603). When the newly input data can be stored in the location Obj3, the newly input data is stored in the location Obj3 (S604).

On the other hand, when the newly input data cannot be stored in the location Obj3, it is judged that data more than the memory amount which can be processed by the decoder are input, and the process proceeds to step S605.

When the data more than the memory amount which can be processed by the decoder are input, the decoding incapability process is performed (S605).

In this decoding incapability process, the decoding process for the object of the newly input data is interrupted until the next I frame data is input and the reservation of the memory address spaces is started again at a time when the next I frame is received.

Next, the core profile mode as one of the storage methods according to the eleventh embodiment will be described with reference to FIGS. 22(a)–22(d) and 29 to 31.

The reservation of memory spaces in the core profile mode according to the eleventh embodiment increases the efficiency of the memory in cases of core profile mode as well as reduces the number of times that the data relocation process having a high risk of interruption of the decoding process is performed. The details are described with reference to FIG. 29.

Figure 29:
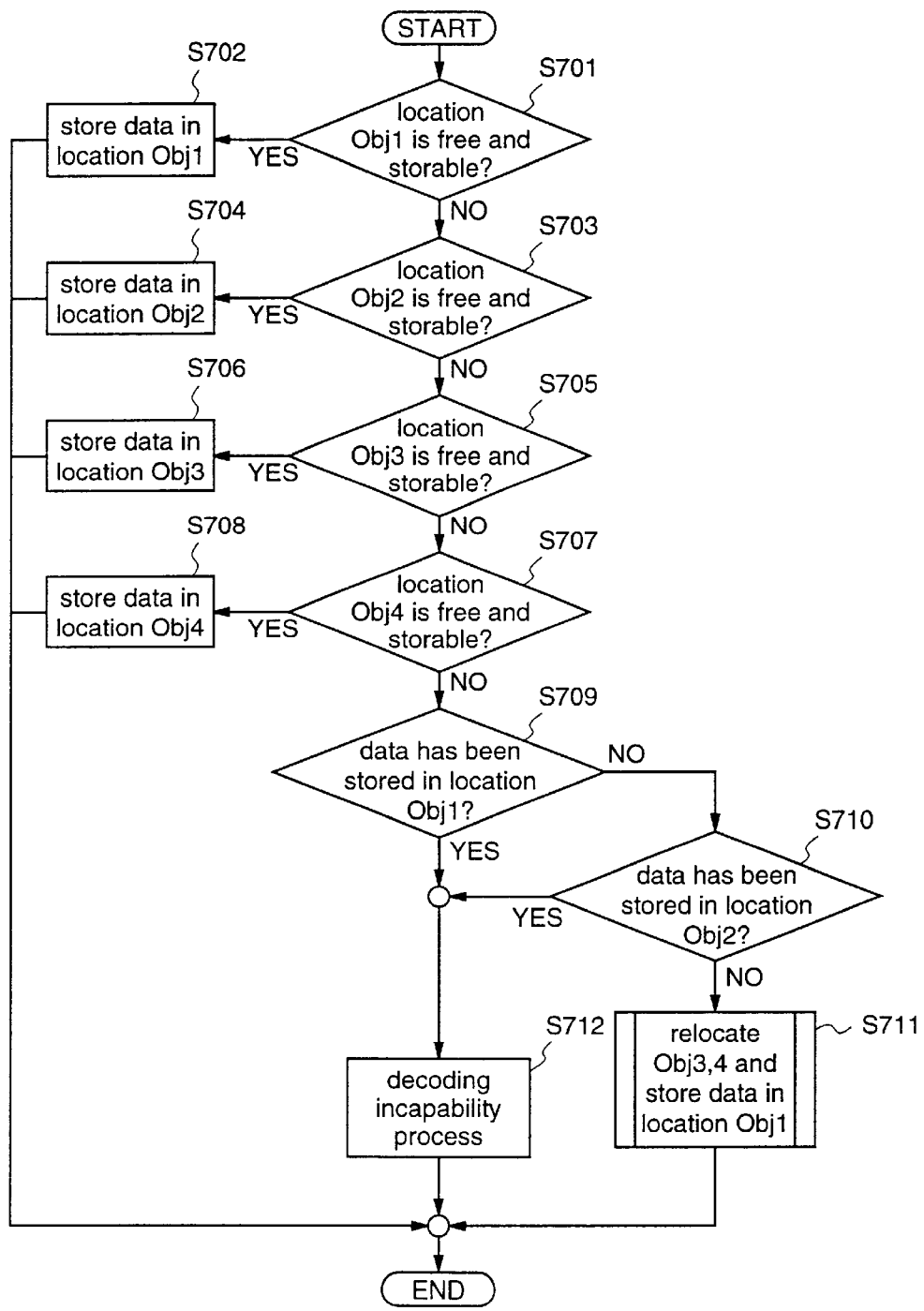
FIG. 29 is a flowchart for explaining an example of a procedure of reserving memory address spaces in the core profile mode according to the eleventh embodiment.

FIG. 29 is a flowchart for explaining an example of the procedure of reserving the memory address spaces in the core profile mode. This procedure is started when a new object data is input after the apparatus is switched into the core profile mode.

When the new object data is input after the apparatus is switched into the core profile mode, it is initially judged whether the location Obj1 is a free space and the input data can be stored in the location Obj1 (S701). When the location Obj1 is a free space and the input data can be stored in the location Obj1, the newly input data is stored in the location Obj1 (S702).

On the other hand, when the location Obj1 is not a free space or when the input data cannot be stored in the location Obj1, it is judged whether the location Obj2 is a free space and the input data can be stored in the location Obj2 (S703). When the location Obj2 is a free space and the input data can be stored in the location Obj2, the newly input data is stored in the location Obj2 (S704).

When the location Obj2 is not a free space or when the input data cannot be stored in the location Obj2, it is judged whether the location Obj3 is a free space and the input data can be stored in the location Obj3 (S705). When the location Obj3 is a free space and the input data can be stored in the location Obj3, the newly input data is stored in the location Obj3 (S706).

When the location Obj3 is not a free space or when the input data cannot be stored in the location Obj3, it is judged whether the location Obj4 is a free space and the input data can be stored in the location Obj4 (S707). When the location Obj4 is a free space and the input data can be stored in the location Obj4, the newly input data is stored in the location Obj4 (S708).

On the other hand, when the location Obj4 is not a free space or the input data cannot be stored in the location Obj4, the newly input data cannot be stored in any of the locations Obj1, Obj2, Obj3 and Obj4 in the present data arrangement in the memory. Accordingly, the relocation of the memory address spaces is performed and then the process of reserving the memory address space for storing the newly input object data is performed.

The memory area is previously reserved so that object data of all image sequences constituting an image can be stored. Therefore, when the newly input data cannot be stored in any of the locations Obj1, Obj2, Obj3 and Obj4, it means that the number of objects using the memory is one and the object using the memory is in the location Obj3 or Obj4 in FIG. 22(d). Therefore, the relocation of the memory address spaces is performed by moving the object in the location Obj3 or Obj4 to the location Obj1 or Obj2 in FIG. 22(b) so as to widen a free space.

As described above, in the memory management method according to the present invention, the memory area is previously reserved so that object data of all image sequences constituting an image can be stored. Therefore, when the number of objects is two, the sum of the sizes of the two objects does not exceed the total memory capacity. In addition, the core profile mode is subject to following constraints. When the number of objects is three or four, as described with reference to FIGS. 22(c) and 22(d), the memory is utilized by being divided into two. Therefore, it goes without saying that the size of one object cannot exceed half of the total memory capacity, and the sum of the sizes of the two objects does not exceed half of the total memory capacity.

Therefore, it is initially examined whether data have already been stored in the locations Obj1 and Obj2 (S701 and S703). When no data has been stored in any of the locations Obj1 and Obj2, the relocation of the data in the locations Obj3 and Obj4 is performed as shown in FIGS. 22(a)–22(d) and then the newly input data is stored in the location Obj1 (S711). The details of step S711 are described later with reference to FIG. 30.

In addition, when data has already stored in one of the locations Obj1 and Obj2 and the newly input data cannot be stored, it means that the newly input data is an abnormal data which is against the above-mentioned constraints. Therefore, the newly input data cannot be stored in the memory and it is necessary to perform the decoding incapability process (S712).

In this decoding incapability process, the decoding process for the object of the newly input data is interrupted until the next I frame data is input and the reservation of the memory address spaces is started again when the next I frame is received.

As described above, it is initially judged whether the memory for a new object data can be reserved, and then only when the memory for the new object data cannot be reserved the memory spaces of the existing objects are relocated. Thereby, the data relocation process having a high risk of interruption of the decoding process can be reduced. Accordingly, the efficiency of the memory can be increased as well as the risk of the decoding incapability due to the exhaustion of the memory required for the decoding can be greatly reduced. Therefore, the memory management method of high practical value can be realized.

Then, the process of relocating data in the locations Obj3 and Obj4 in the core profile mode in step S711 is described with reference to FIG. 30.

Figure 30:
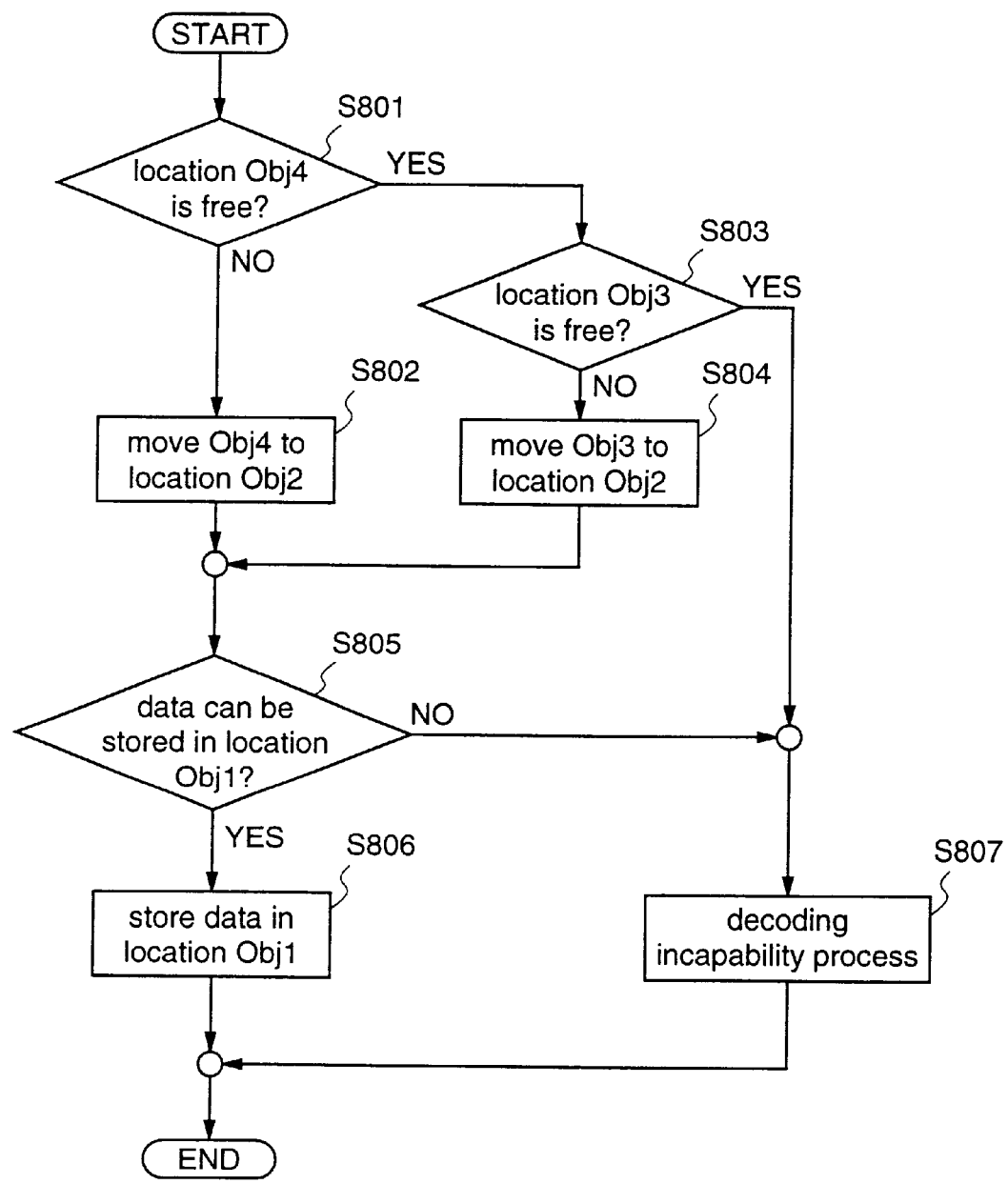
FIG. 30 is a flowchart for explaining relocation of the data in the locations of Obj3 and Obj4 in the core profile mode according to the eleventh embodiment.
Figure 31:
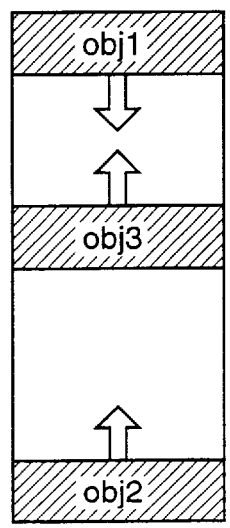
FIGS. 31(a)–31(c) and 32 are diagrams showing an example of a memory with a flowchart for explaining relocation of the memory when a permissible value of each object data is changed in the memory management method in the core profile mode according to the eleventh embodiment.
Figure 31:
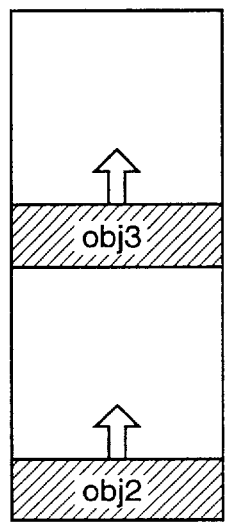
Figure 31:
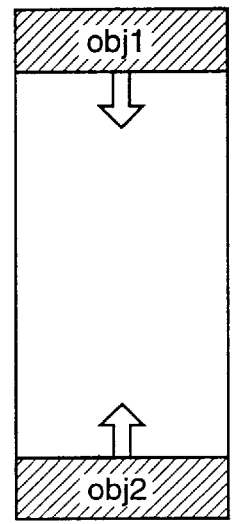

FIG. 30 is a flowchart for explaining the relocation of data in the locations Obj3 and Obj4 in the core profile mode.

It is initially examined whether the location Obj4 is a free space (S801). When the location Obj4 is not a free space, i.e., data is stored in the location Obj4, the data stored in the location Obj4 shown in FIGS. 22(a)–22(d) is moved to the location Obj2 (S802).

On the other hand, when the location Obj4 is a free space, it is examined whether the location Obj3 is a free space or not (S803). When the location Obj3 is not a free space, i.e., data is stored in the location Obj3, the data stored in the location Obj3 shown in FIGS. 22(a)–22(d) is moved to the location Obj2 (S804) and the process proceeds to step S805.

In addition, when both of the locations Obj3 and Obj4 are judged to be free spaces in steps S801 and S803, it is judged that data more than the memory amount which can be processed by the decoder are input, and the process proceed to step S807.

Then, in step S805, it is examined whether the newly input data can be stored in the location Obj1. When the newly input data can be stored in the location Obj1, the newly input data is stored in the location Obj1 (S806).

On the other hand, when the newly input data cannot be stored in the location Obj1, it is judged whether data more than the memory amount which can be processed by the decoder are input, and the process proceeds to step 806.

When the data more than the memory amount which can be processed by the decoder are input, the decoding incapability process is performed (S807).

In this decoding incapability process, the decoding process for the object of the newly input data is interrupted until the next I frame data is input and the reservation of the memory address spaces is started again at a time when the next I frame is received.

Then, the data relocation process accompanied by changes in size of data of an object in the core profile mode is described with reference to FIGS. 22(a)–22(d), 31(a)–31(c) and 32.

In the core profile mode, in a case where the number of objects is three and the data arrangement as shown in FIG. 31(a) is assumed, when the object data in the location Obj1 is erased, the memory areas are reserved toward the directions as shown by arrows in FIG. 31(b) from the locations Obj2 and Obj3.

However, in the core profile mode, when the number of objects stored in the memory is reduced to two or less, it is unnecessary to divide the image storage memory in two. It is sufficient if the size of one object or the sum of the sizes of two objects does not exceed the total memory capacity. Therefore, the acceptable value of the maximum number of macroblocks for each object is increased from a time when the number of objects stored in the memory is reduced to two or less. Accordingly, when the size of input data of the object stored in the memory is increased to half of the image storage memory or larger, the necessary memory capacity cannot be reserved in the above-mentioned data arrangement as shown in FIG. 31(b).

To be specific, when the number of objects is reduced from three or more to two or less and the size of the input data of the object is increased, and thereby the necessary memory capacity cannot be reserved in the present data arrangement in the memory, the relocation of the data in the memory is performed to obtain a data arrangement as shown in FIG. 31(c) so as to reserve the necessary memory capacity. The above-mentioned data arrangement is required only when a new object is input, while the data relocation which is described below with reference to FIG. 32 is an only data relocation which is required in cases other than the case where a new object is input.

Figure 32:
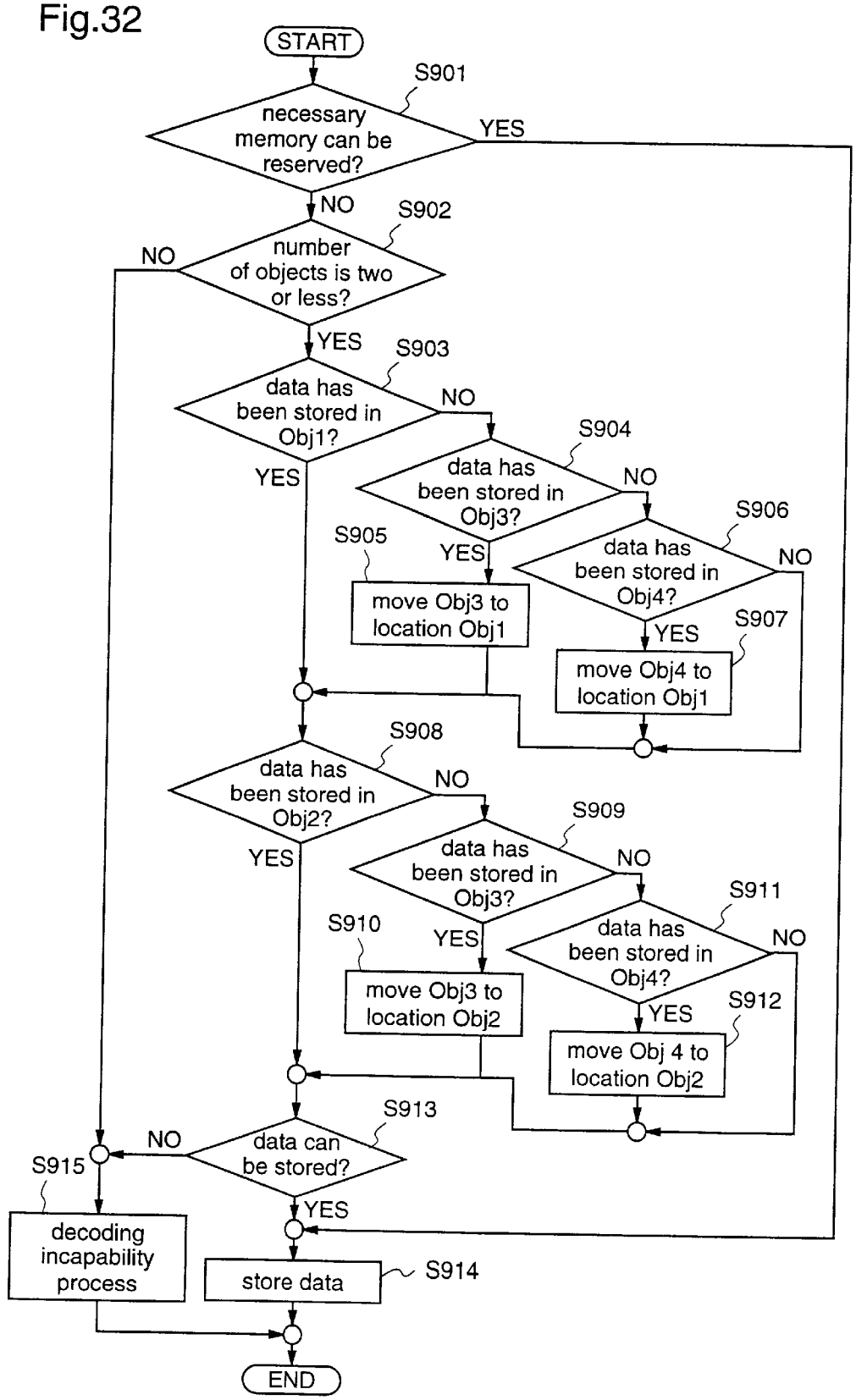

FIG. 32 is a flowchart for explaining the operation which is performed each time when data of an object is input in the memory management method in the core profile mode. It includes the data relocation process of the case where the acceptable value of each object data is changed.

When data of the object is input, it is judged whether a necessary memory area can be reserved (S901). When the necessary memory area can be reserved, the process proceeds to step S914.

On the other hand, when the necessary memory area cannot be reserved, it is examined whether the number of objects is two or less (S902). When the number of the objects is not two or less, it is judged that incorrect data which cannot be subjected to the decoding process is input, and then the process proceeds to step S915.

On the other hand, when the number of the objects is two or less, it is examined whether data is stored in the location Obj1 (S903).

At this time, when no data is stored in the location Obj1, it is further examined whether data is stored in the location Obj3 (S904). When data is stored in the location Obj3, the data stored in the location Obj3 is moved to the location Obj1 (S905). On the other hand, when no data is stored in the location Obj3, it is further examined whether data is stored in the location Obj4 (S906). When data is stored in the location Obj4, the data stored in the location Obj4 is moved to the location Obj1 (S907).

Then, it is examined whether data is stored in the location Obj2 (S908).

At this time, when no data is stored in the location Obj2, it is further examined whether data is stored in the location Obj3 (S909). When data is stored in the location Obj3, the data stored in the location Obj3 is moved to the location Obj2 (S910). On the other hand, when no data is stored in the location Obj3, it is further examined whether data is stored in the location Obj4 (S911). When data is stored in the location Obj4, the data stored in the location Obj4 is moved to the location Obj2 (S912).

Then, it is judged whether the necessary memory area can be reserved (S913). When the necessary memory area can be reserved, the process proceeds to step S914.

On the other hand, when the necessary memory area cannot be reserved, it is judged that incorrect data which cannot be subjected to the decoding process is input, and the process proceeds to step S915.

When the necessary memory area can be reserved, the object data is stored in this memory area (S914).

On the other hand, when the necessary memory area cannot be reserved, it is judged that incorrect data which cannot be subjected to the decoding process is input, and then the decoding incapability process is performed (S915).

In this decoding incapability process, the decoding process for the object of the newly input data is interrupted until the next I frame data is input and the reservation of memory address spaces is started again at a time when the next I frame is received.

As described above, it is judged whether the memory for storing the data of an object can be reserved, and then only when the memory cannot be reserved, the relocation of the memory space locations for the existing objects is performed. Accordingly, the data relocation process having a high risk of interruption of the decoding process can be reduced. Thereby, the efficiency of the memory can be increased as well as the risk of the decoding incapability due to exhaustion of the memory required for the decoding can be greatly reduced. Therefore, the memory management method of high practical value can be realized.

In this eleventh embodiment, in the decoding incapability process, the object of the newly input data is decoded from the next I frame data. However, it is possible that all data which are input after that object are not decoded at all.

[Embodiment 12]

According to the twelfth embodiment, when a program for implementing the memory management method, the image coding method, the image decoding method or the image display method according to any of the first to eleventh embodiments is recorded in a storage medium such as a floppy disk, the process according to any of the aforementioned embodiments can be easily implemented in an independent computer system.

Figure 14:
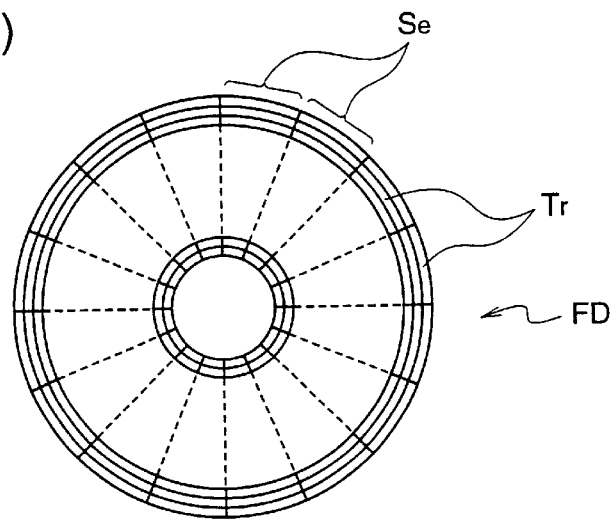
FIGS. 14(a)–14(c) are diagrams for explaining a storage medium which contains a program for implementing the memory management method, image coding method, image decoding method or image display method according to any of the first to eleventh embodiments by a computer system, according to a twelfth embodiment.
Figure 14:
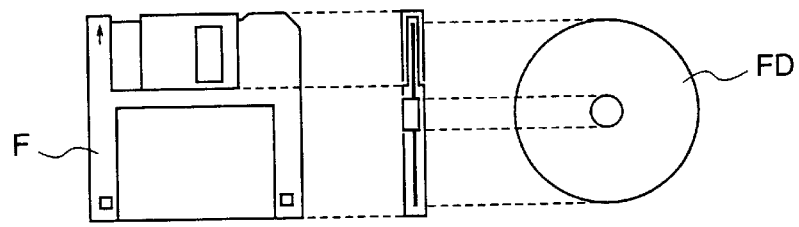
Figure 14:
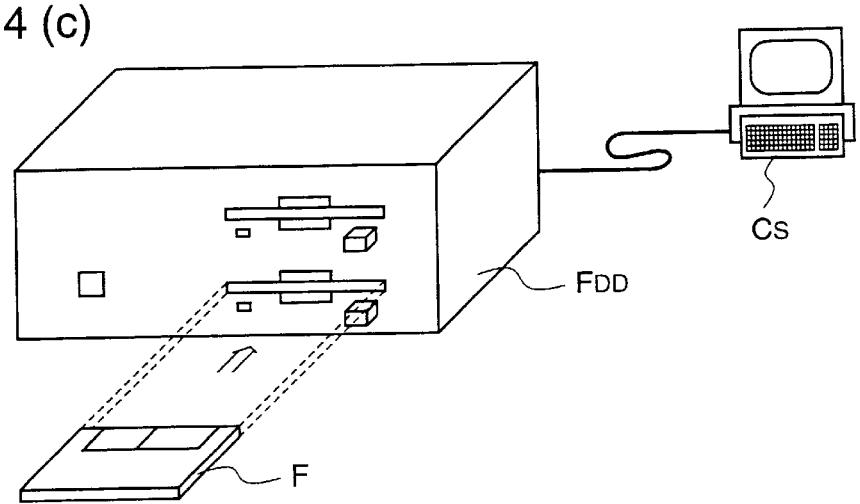

FIGS. 14(a)–14(c) are diagrams for explaining the case where the memory management method, image coding method, image decoding method or image display method according to any of the first to eleventh embodiments is executed by a computer system using a floppy disk which contains a memory management program, image coding program, image decoding program or image display program corresponding to the respective methods.

FIG. 14(b) shows a front view of a floppy disk, a cross-sectional view thereof, and a floppy disk body FD. FIG. 14(a) shows an example of a physical format of the floppy disk body FD as the storage medium body. The floppy disk is composed of the floppy disk body FD and a case F which contains the floppy disk body FD. On the surface of the disk body FD, a plurality of tracks Tr are formed concentrically from the outer circumference of the disk toward the inner circumference. Each track is divided into 16 sectors (Se) in the angular direction. Therefore, in the floppy disk containing the above-mentioned program, at least one of the memory management program, image coding program, image decoding program and image display program is recorded in the assigned sectors on the floppy disk body FD.

FIG. 14(c) shows the structure for recording/reproducing the program in/from the floppy disk FD. To be specific, when the program is recorded in the floppy disk FD, the memory management method, image coding method, image decoding method or image display method as the program is written in the floppy disk FD from the computer system Cs through the floppy disk drive FDD. When the coding or decoding apparatus is constructed in the computer system Cs by the program recorded in the floppy disk FD, the program is read from the floppy disk FD by the floppy disk drive FDD and then loaded to the computer system Cs.

Thereby, the program storage medium for executing at least one of the memory management program, image coding program, image decoding program and image display program in an independent computer system can be obtained.

Although in the above description a floppy disk is employed as a storage medium, a magnetic storage medium having a larger capacity such as an HDD and movable disk, or an optical disk such as a CD-ROM, CD-R, CD-RW, PD, DVD and MO may be employed. Further, the storage medium is not restricted to these disks, and any medium may be employed as long as it can contain the program, for example, various types of IC cards (memory cards).

What is claimed is:

1. A memory management method for simultaneously recording image data comprising n-pieces, n being an integer equal to or larger than 2, of image sequences having variable image sizes, said memory management method comprising:
dividing an area of a memory into first to n/2-th memory address spaces by allocating addresses from ADstart[i] to ADend[i] to a i-th memory address space, respectively;
using an area from one of ends of ADstart[i] and ADend[i] of the i-th memory address space toward one of a higher memory address and a lower memory address in the i-th memory address space as an area in which image data of a k-th image sequence are recorded;
using an area from another of the ends of ADstart[i] and ADend[i] toward another of the lower memory address and the higher memory address in the i-th memory address space as an area in which image data of a k+1-th image sequence are recorded; and
dynamically changing a boundary of the area of the memory for storing the image data of the k-th image sequence and the k+1-th image sequence.

2. The memory management method of claim 1, further comprising:
monitoring, when the image data of the k-th image sequence and the image data of the k+1-th image sequence are recorded together in the i-th memory address space, whether one of the image data are overwritten by the other of the image data; and
notifying outside, when image data are read from the memory, whether image data of an image sequence to be read out have been destroyed by overwriting.

3. An image decoding method for simultaneously decoding image data of first to n-th image sequences, said image decoding method comprising:
recording predictive image data in the memory which is managed by the memory management method of claim 2 when inter-frame prediction decoding is performed; and
interrupting a decoding process when image data in the memory which are required for the decoding of the image sequence are destroyed until decoding can be performed without referring to the image data in the memory.

4. The memory management method of claim 1, further comprising:
monitoring, when the image data of the k-th image sequence and the image data of the k+1-th image sequence are recorded together in the i-th memory address space, whether one of the image data are overwritten by the other of the image data; and
referring to priority information of the image sequences which is input from outside when image data are destroyed by overwriting, and performing the overwriting so as to destroy the image data having a lower priority and protecting the image data having a higher priority.

5. An image decoding method for simultaneously decoding image data of first to n-th image sequences, said image decoding method comprising:

when inter-frame prediction decoding is performed, recording predictive image data in the memory which is managed according to the memory management method of claim 4 so that an important image sequence has a higher priority; and making image data which are required for decoding of the important image sequence hard to be destroyed.

6. An image coding method for simultaneously coding image data of first to n-th image sequences, said image coding method comprising:

recording predictive image data in the memory which is managed according to the memory management method of claim 1 when inter-frame prediction coding is performed.

7. An image decoding method for simultaneously decoding image data of first to n-th image sequences, said image decoding method comprising:

recording predictive image data in the memory which is managed according to the memory management method of claim 1 when inter-frame prediction decoding is performed.

8. An image display method for simultaneously displaying image data of first to n-th image sequences, said image display method comprising:

recording image data to be displayed in the memory which is managed according to the memory management method of claim 1.

9. An image display method for simultaneously displaying image data of first to n-th image sequences of claim 8, further comprising:

displaying, when image data in the memory which are required for display of the image sequence are destroyed, image data at a latest time which are not destroyed in the image sequence in place of the destroyed image data.

10. A memory management apparatus for simultaneously recording image data comprising n-pieces, n being an integer equal to or larger than 2, of image sequences having variable image sizes, said memory management apparatus comprising:

a memory division unit operable to divide an area in the memory into first to n/2-th memory address spaces by allocating addresses from ADstart[i] to ADend[i] as a i-th memory address space, respectively; and an address generation unit operable to generate an address for using an area from one of ends of ADstart[i] and ADend[i] of the i-th memory address space toward one of a higher memory address and a lower memory address in the i-th memory address as an area in which image data of a k-th image sequence are recorded, using an area from another of the ends of ADstart[i] and ADend[i] toward another of the lower memory address and the higher memory address of the i-th memory address space as an area in which image data of a k+1-th image sequence are recorded, and to dynamically change a boundary of the area in the memory for storing the image data of the k-th image sequence and the k+1-th image sequence.

11. A memory management program which is contained on a memory management program storage medium for implementing a memory management method for simultaneously recording image data comprising n-pieces, n being an integer equal to or larger than 2, of image sequences having variable image sizes, said memory management program implementing the memory management method of:

dividing an area in the memory into first to n/2 memory address spaces by allocating addresses from ADstart[i] to ADend[i] to a i-th memory address space, respectively;

using an area from one of ends of ADstart[i] and ADend[i] of the i-th memory address space toward one of a higher memory address and a lower memory address in the i-th memory address space as an area in which image data of a k-th image sequence are recorded; and using an area from another of the ends of ADstart[i] and ADend[i] toward another of the lower memory address and the higher memory address in the i-th memory address space as an area in which image data of a k+1-th image sequence are recorded, and dynamically changing a boundary of the area in the memory for storing the image data of the k-th image data and the k+1-th image sequence.

12. A memory management method for storing newly input image data in a memory area which is a free space or contains i pieces of image data, said memory management method comprising:

judging whether the newly input image data is data having a variable image size;

when image data can be stored at least one of a lowest side and a highest side of an address of the memory area, storing the newly input image data at one of the lowest address side and the highest address side of the memory area; and when image data cannot be stored in either the lowest address side or the highest address side of the memory area, storing the newly input image data in an intermediate part therebetween, whereby storage in a memory is managed, wherein when the newly input data is not data having variable image size, said storing of the newly input image data in the intermediate part comprises storing the newly input image data in an area which is adjacent to one of image data stored at the highest address side and image data stored at the lowest address side, and when the newly input data is data having variable image size, said storing of the newly input image data in the intermediate part comprises storing the newly input image data in an area which is adjacent to an address central location in the memory area.

13. The memory management method of claim 12, further comprising when the image data which have been stored in the memory area and the newly input image data are all rectangular-shaped image data, and when the newly input image data are to be stored in the intermediate part, relocating memory areas for already stored image data so that the newly input image data are stored in an area which is adjacent to one of the image data which have been stored at the highest address side and the lowest address side.

14. The memory management method of claim 13, wherein said relocating of the memory areas for the already stored image data is performed only when there is insufficient memory area for the newly input image data.

15. The memory management method of claim 12, further comprising when at least one of the image data stored in the memory area and the newly input image data is an arbitrary-shaped image data, and when the newly input image data are to be stored in the intermediate part, relocating memory areas for already stored image data so that the newly input data are stored in an area which is adjacent to an address central location in the memory area.

16. The memory management method of claim 15, wherein said relocating of the memory areas for the already stored image data is performed only when there is insufficient memory area for the newly input image data.

17. The memory management method of claim 12, further comprising while the memory is being managed so as to store the newly input image data in an area which is adjacent to one of the image data which have been stored at the highest address side and the lowest address side when the newly input image data are to be stored in the intermediate part, and when arbitrary-shaped image data are newly input, relocating memory areas for already stored image data so that the newly input image data are stored in an area which is adjacent to the address central location in the memory area when the image data are to be stored in the intermediate part.

18. The memory management method of claim 17, further comprising after said relocating of the memory areas resulting from input of the arbitrary-shaped image data, only when there is insufficient memory area for a newly input image data, relocating the memory areas for the already stored image data so that the newly input image data are stored in an area which is adjacent to the address central location in the memory area when the image data are to be stored in the intermediate part.

* * * * *

UNITED STATES PATENT AND TRADEMARK OFFICE
CERTIFICATE OF CORRECTION

PATENT NO. : 6,836,273 B1
DATED : December 28, 2004
INVENTOR(S) : Shinya Kadono

It is certified that error appears in the above-identified patent and that said Letters Patent is hereby corrected as shown below:

Column 38,
Line 30, please replace "stored at least" with -- stored at at least --.

Signed and Sealed this

Third Day of May, 2005

JON W. DUDAS
*Director of the United States Patent and Trademark Office*